US012698451B2

(12) United States Patent
Harandi et al.

(10) Patent No.: US 12,698,451 B2
(45) Date of Patent: Aug. 4, 2026

(54) PROCESSES AND SYSTEMS FOR UPGRADING A HYDROCARBON-CONTAINING FEED

(71) Applicant: ExxonMobil Chemical Patents Inc., Baytown, TX (US)

(72) Inventors: Mohsen N. Harandi, Calgary (CA); Paul F. Keusenkothen, Houston, TX (US); Ying Liu, Houston, TX (US); James R. Lattner, La Porte, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 467 days.

(21) Appl. No.: 18/253,543

(22) PCT Filed: Nov. 17, 2021

(86) PCT No.: PCT/US2021/059703
§ 371 (c)(1),
(2) Date: May 18, 2023

(87) PCT Pub. No.: WO2022/132368
PCT Pub. Date: Jun. 23, 2022

(65) Prior Publication Data
US 2023/0416622 A1       Dec. 28, 2023

Related U.S. Application Data

(60) Provisional application No. 63/126,247, filed on Dec. 16, 2020.

(51) Int. Cl.
| | |
|---|---|
| *C10J 3/46* | (2006.01) |
| *B01D 53/26* | (2006.01) |
| *C01B 3/28* | (2026.01) |
| *C01B 3/506* | (2026.01) |
| *C10B 55/10* | (2006.01) |
| *C10B 57/02* | (2006.01) |
| *C10K 1/00* | (2006.01) |

(52) U.S. Cl.
CPC ............ *C10J 3/463* (2013.01); *B01D 53/265* (2013.01); *C01B 3/28* (2013.01); *C01B 3/506* (2013.01); *C10B 55/10* (2013.01); *B01D 2257/304* (2013.01); *B01D 2257/80* (2013.01); *C01B 2203/0277* (2013.01); *C01B 2203/046* (2013.01); *C01B 2203/0485* (2013.01); *C01B 2203/0495* (2013.01); *C01B 2203/0883* (2013.01); *C10J 2300/0909* (2013.01)

(58) Field of Classification Search
CPC .......... C10J 3/463; B01D 53/265; C01B 3/30; C01B 3/506; C10B 55/10
See application file for complete search history.

(56) References Cited

U.S. PATENT DOCUMENTS

| | | | |
|---|---|---|---|
| 3,694,346 A | 9/1972 | Blaser et al. | |
| 4,675,098 A * | 6/1987 | Miyauchi ................. | C10G 9/32 208/127 |
| 10,407,631 B2 | 9/2019 | Harandi et al. | |
| 2012/0125813 A1* | 5/2012 | Bridges .................. | C10G 47/00 208/51 |

FOREIGN PATENT DOCUMENTS

| | | |
|---|---|---|
| WO | 2019/099247 | 5/2019 |

* cited by examiner

*Primary Examiner* — Yong L Chu
(74) *Attorney, Agent, or Firm* — WOMBLE BOND DICKINSON (US) LLP; Kevin Davis

(57) ABSTRACT

Processes and for converting a hydrocarbon-containing feed by pyrolysis and gasification/combustion. The hydrocarbon-containing feed can be heated to produce a heated feed that can be separated into a vapor and a liquid. At least a portion of the vapor and/or at least a portion of the liquid and a particle stream can be fed into a pyrolysis zone and contacted therein to effect pyrolysis of the hydrocarbons and produce a pyrolysis effluent.

24 Claims, 4 Drawing Sheets

PROCESSES AND SYSTEMS FOR UPGRADING A HYDROCARBON-CONTAINING FEED

CROSS-REFERENCE TO RELATED APPLICATIONS

This application is a US national phase application of PCT Application Serial No. PCT/US2021/059703 having a filing date of Nov. 17, 2021, which claims priority to and the benefit of U.S. Provisional Application No. 63/126,247 having a filing date of Dec. 16, 2020, the disclosures of both of which are incorporated herein by reference in their entireties.

FIELD

This disclosure relates to processes and systems for converting a hydrocarbon-containing feed. In particular, this disclosure relates to processes and systems for converting a hydrocarbon-containing feed by pyrolysis and gasification/combustion to produce various products, e.g., olefins.

BACKGROUND

Steam cracking, also referred to as pyrolysis, has long been used to crack various hydrocarbon-containing feeds into olefins, preferably light olefins such as ethylene, propylene, and butenes. Conventional steam cracking utilizes a pyrolysis furnace ("steam cracker") that has two main sections: a convection section and a radiant section. The hydrocarbon-containing feed typically enters the convection section of the furnace as a liquid (except for light feedstocks that typically enter as a vapor) where the feedstock is typically heated and vaporized by indirect heat exchange with a hot flue gas from the radiant section and by direct contact with steam. The vaporized feedstock and steam mixture is fed into the radiant section where the cracking takes place. The resulting pyrolysis effluent, including olefins, leaves the pyrolysis furnace for further downstream processing, including quenching.

Conventional pyrolysis furnaces do not have the flexibility to process residues, crudes, or many residues, crude gas oils, or naphtha that are contaminated with non-volatile components. Non-volatile components, if present in the feed, typically cause fouling within the radiant section of the pyrolysis furnace. An external vaporization drum or flash drum has been implemented to separate vaporized hydrocarbons from liquid hydrocarbons to address the fouling problems in the pyrolysis furnace. The vaporized hydrocarbons are then cracked in the pyrolysis furnace and the liquid hydrocarbons that include nonvolatile components are removed and used as fuel. The liquid hydrocarbons, however, still contain a substantial quantity of hydrocarbons which, if converted into higher-value lighter hydrocarbons such as olefins via cracking, would bring substantial additional value to the crude oil feed. Thus, for decades the petrochemical industry has been trying to take advantage of relatively low-cost heavy crude oil to make substantial quantities of valuable chemicals such as olefins. The large amount of non-volatiles in the low-cost heavy crude oil, however, requires extensive and expensive processing.

There is a need, therefore, for improved processes and systems for upgrading hydrocarbon-containing feeds to produce valuable chemical products such as olefins. This disclosure satisfies this and other needs.

SUMMARY

The present inventors have devised processes and systems for converting a hydrocarbon-containing feed by pyrolysis and gasification/combustion. In a first aspect of this disclosure, the process for converting a hydrocarbon-containing feed by pyrolysis and gasification/combustion can include (I) heating a hydrocarbon-containing feed that can include $C_{5+}$ hydrocarbons and water to produce a heated feed; (II) separating a vapor fraction and a liquid fraction from the heated feed, where the vapor fraction can include steam; and (III) feeding at least one of (a) a portion of the vapor fraction through a first pyrolysis feed inlet and (b) a portion of the liquid fraction through a second pyrolysis feed inlet, and a first particle stream that can include particles having a pyrolysis temperature through a first particles inlet into a first pyrolysis zone. In some embodiments, the process can include (IV) optionally feeding a first steam stream through a first steam stream inlet into the first pyrolysis zone. The process can also include (V) contacting the vapor fraction and/or the liquid fraction with the particles in the first pyrolysis zone under a first set of pyrolysis conditions to effect pyrolysis of at least a portion of the hydrocarbons in the vapor fraction and/or the liquid fraction and (VI) obtaining from the first pyrolysis zone a first pyrolysis zone effluent that can include olefins and the particles, where coke is formed on the surface of the particles. The process can also include (VII) obtaining from the first pyrolysis zone effluent a first gaseous stream rich in the olefins and a second particle stream rich in the particles; (VIII) feeding at least a portion of the second particle stream, an oxidant stream, and optionally a second steam stream into a gasification/combustion zone; and (IX) contacting the second particle stream, the oxidant stream, and the optional second steam stream within the gasification/combustion zone to effect gasification and/or combustion of at least a portion of the coke disposed on the surface of the particles to produce a gasification/combustion zone effluent that can include regenerated particles and a gasification/combustion gas mixture. The process can also include (X) obtaining from the gasification/combustion zone effluent a second gaseous stream rich in the gasification/combustion gas mixture and a third particle stream rich in the regenerated particles; and (XI) feeding at least a portion of the third particle stream into the first pyrolysis zone as at least a portion of the first particle stream fed into the first pyrolysis zone in step (III).

In a second aspect of this disclosure, a process for converting a hydrocarbon-containing feed by pyrolysis and gasification/combustion can include (I) feeding a first particle stream that can include particles at a pyrolysis temperature into a pyrolysis zone through a particles inlet in proximity to or connected to a first end of the pyrolysis zone; (II) feeding a vapor phase hydrocarbon-containing feed that can include hydrocarbons and steam into the pyrolysis zone through a first pyrolysis feed inlet, where the first pyrolysis feed inlet can be located closer to the first end than a second end of the pyrolysis zone; and (III) contacting the vapor phase hydrocarbon-containing feed with the particles in the pyrolysis zone to effect pyrolysis of at least a portion of the hydrocarbons in the vapor phase hydrocarbon-containing feed to produce a first pyrolysis zone effluent that can include olefins and the particles, where coke is formed on the surface of the particles. The process can also include (IV) feeding a liquid phase hydrocarbon-containing feed into the pyrolysis zone through a second pyrolysis feed inlet, where the second pyrolysis feed inlet is located closer to the second end than the first end of the pyrolysis zone, and the second pyrolysis feed inlet is downstream of the first pyrolysis feed inlet; and (V) contacting the liquid phase hydrocarbon-containing feed with the particles in the pyrolysis zone to effect pyrolysis of at least a portion of the liquid phase hydrocarbon-containing feed to produce a second pyrolysis zone effluent that can include additional olefins and the particles, where additional coke is formed on the surface of the particles. The process can also include (VI) obtaining from the second pyrolysis zone effluent a first gaseous stream rich in the olefins and a second particle stream rich in the particles; (VII) feeding at least a portion of the second particle stream, an oxidant stream, and an optional steam stream into a gasification/combustion zone; and (VIII) contacting the second particle stream, the oxidant stream, and the optional steam stream within the gasification/combustion zone to effect gasification/combustion of at least a portion of the coke disposed on the surface of the particles to produce a gasification/combustion zone effluent that can include heated and regenerated particles and a gasification/combustion gas mixture. The process can also include (IX) obtaining from the gasification/combustion zone effluent a second gaseous stream rich in gasification/combustion gas mixture and a third particle stream rich in the heated and regenerated particles; and (X) feeding at least a portion of the third particle stream into the pyrolysis zone as at least a portion of the heated particles fed into the pyrolysis zone in step (I).

In a third aspect of this disclosure, a process for converting a hydrocarbon-containing feed by pyrolysis and gasification/combustion can include (I) feeding the hydrocarbon-containing feed through a hydrocarbon feed inlet into a pyrolysis zone and a first particle stream that can include heated particles through a first particle inlet into the pyrolysis zone and (II) contacting the hydrocarbon-containing feed with the heated particles in the pyrolysis zone to effect pyrolysis of at least a portion of the hydrocarbon-containing feed to produce a pyrolysis zone effluent that can include olefins and the particles, where coke is formed on the surface of the particles. In some embodiments, the process can also include (III) carrying at least one of (IIIa), (IIIb), and (IIIc) below. Step (IIIa) can include carrying out (IIIa-1) and (IIIa-2). Step (IIIa-1) can include feeding a first quench medium stream that can include one or more reactive hydrocarbons through a first quench medium inlet into the pyrolysis zone, where the first quench medium inlet can be downstream of the hydrocarbon feed inlet, where at least a portion of the one or more reactive hydrocarbons undergoes pyrolysis, and where a cooled pyrolysis zone effluent can be obtained from the pyrolysis zone. Step (IIIa-2) can include obtaining from the cooled pyrolysis zone effluent a first gaseous stream rich in the olefins and a second particle stream rich in the particles. Step (IIIb) can include carrying out (IIIb-1) and (IIIb-2). Step (IIIb-1) can include contacting the pyrolysis zone effluent with a second quench medium that can include one or more reactive hydrocarbons to produce a cooled pyrolysis zone effluent, where the pyrolysis zone effluent can be at a temperature sufficient to effect pyrolysis of at least a portion of the one or more reactive hydrocarbons in the second quench medium. Step (IIIb-2) can include obtaining from the cooled pyrolysis zone effluent a first gaseous stream rich in the olefins and a second particle stream rich in the particles. Step (IIIc) can include carrying out (IIIc-1) and (IIIc-2). Step (IIIc-1) can include obtaining from the pyrolysis zone effluent a first gaseous stream rich in the olefins and a second particle stream rich in the particles. Step (IIIc-2) can include contacting the first gaseous stream with a third quench medium that can include one or more reactive hydrocarbons to produce a cooled first gaseous stream, where the first gaseous stream can be at a temperature sufficient to effect pyrolysis of at least a portion of the one or more reactive hydrocarbons in the third quench medium. The process can also include (IV) feeding at least a portion of the second particle stream, an oxidant stream, and an optional second steam stream into a gasification/combustion zone and (V) contacting the second particle stream, the oxidant stream, and the optional steam stream within the gasification/combustion zone to effect gasification/combustion of at least a portion of the coke disposed on the surface of the particles to produce a gasification/combustion zone effluent that can include heated and regenerated particles and a gasification/combustion gas mixture. The process can also include (VI) obtaining from the gasification/combustion zone effluent a second gaseous stream rich in the gasification/combustion gas mixture and a third particle stream rich in the heated and regenerated particles; and (VII) feeding at least a portion of the third particle stream into the pyrolysis zone as at least a portion of the heated particles fed into the pyrolysis zone in step (I).

DETAILED DESCRIPTION

Figure 1:
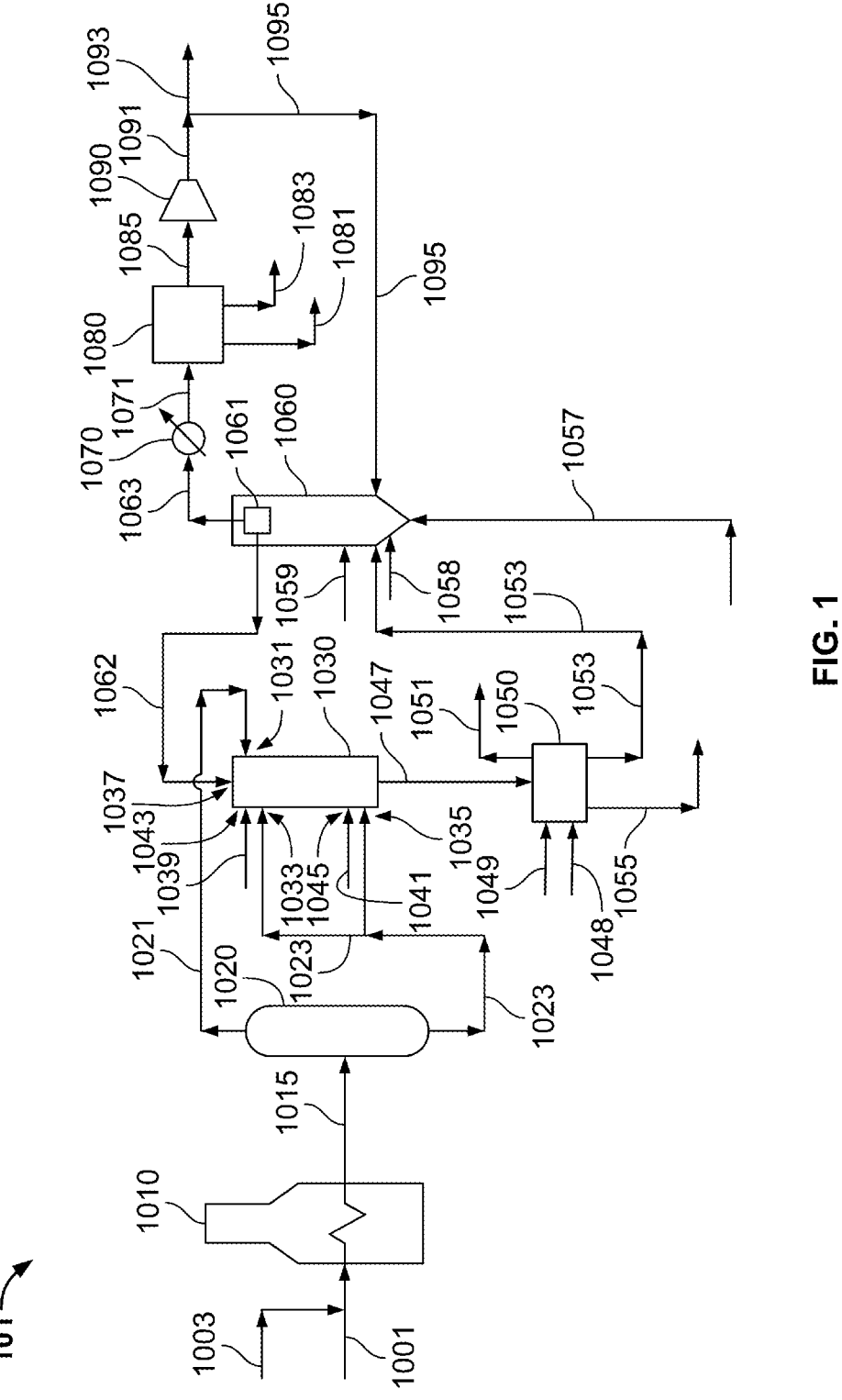
FIG. 1 depicts an illustrative system for separating a hydrocarbon-containing feed into a vapor fraction and a liquid fraction and converting the vapor fraction and/or the liquid fraction within a pyrolysis zone, according to one or more embodiments described.

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention may be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other steps, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Certain embodiments and features are described herein using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated.

As used herein, the indefinite article "a" or "an" shall mean "at least one" unless specified to the contrary or the context clearly indicates otherwise. Thus, embodiments using "a pyrolysis reactor" include embodiments where one, two or more pyrolysis reactors are used, unless specified to the contrary or the context clearly indicates that only one pyrolysis reactor is used.

The term "hydrocarbon" as used herein means (i) any compound consisting of hydrogen and carbon atoms or (ii) any mixture of two or more such compounds in (i). The term "Cn hydrocarbon," where n is a positive integer, means (i) any hydrocarbon compound comprising carbon atom(s) in its molecule at the total number of n, or (ii) any mixture of two or more such hydrocarbon compounds in (i). Thus, a C2 hydrocarbon can be ethane, ethylene, acetylene, or mixtures of at least two of these compounds at any proportion. A "Cm to Cn hydrocarbon" or "Cm-Cn hydrocarbon," where m and n are positive integers and m<n, means any of Cm, Cm+1, Cm+2, . . . , Cn−1, Cn hydrocarbons, or any mixtures of two or more thereof. Thus, a "C2 to C3 hydrocarbon" or "C2-C3 hydrocarbon" can be any of ethane, ethylene, acetylene, propane, propene, propyne, propadiene, cyclopropane, and any mixtures of two or more thereof at any proportion between and among the components. A "saturated C2-C3 hydrocarbon" can be ethane, propane, cyclopropane, or any mixture thereof of two or more thereof at any proportion. A "Cn+ hydrocarbon" means (i) any hydrocarbon compound comprising carbon atom(s) in its molecule at the total number of at least n, or (ii) any mixture of two or more such hydrocarbon compounds in (i). A "Cn− hydrocarbon" means (i) any hydrocarbon compound comprising carbon atoms in its molecule at the total number of at most n, or (ii) any mixture of two or more such hydrocarbon compounds in (i). A "Cm hydrocarbon stream" means a hydrocarbon stream consisting essentially of Cm hydrocarbon(s). A "Cm-Cn hydrocarbon stream" means a hydrocarbon stream consisting essentially of Cm-Cn hydrocarbon(s).

The term "non-volatile components" as used herein refers to the fraction of a petroleum feed having a nominal boiling point of at least 590° C., as measured by ASTM D6352-15 or D-2887-18. Non-volatiles include coke precursors, which are large, condensable molecules that condense in the vapor and then form coke during pyrolysis of the petroleum feed.

The term "crude" as used herein means whole crude oil as it flows from a wellhead, a production field facility, a transportation facility, or other initial field processing facility, optionally including crude that has been processed by a step of desalting, treating, and/or other steps as may be necessary to render it acceptable for conventional distillation in a refinery. Crude, as used herein, is presumed to contain resid. The term "crude fraction", as used herein, means a hydrocarbon fraction obtained via the fractionation of crude.

The term "resid" as used herein refers to a bottoms cut of a crude distillation process that contains non-volatile components. Resids are complex mixtures of heavy petroleum compounds otherwise known in the art as residuum or residual. Atmospheric resid is the bottoms product produced from atmospheric distillation of crude where a typical endpoint of the heaviest distilled product is nominally 343° C., and is referred to as 343° C. resid. The term "nominally", as used herein, means that reasonable experts may disagree on the exact cut point for these terms, but by no more than +/−55.6° C. preferably no more than +/−27.8° C. Vacuum resid is the bottoms product from a distillation column operated under vacuum where the heaviest distilled product can be nominally 566° C., and is referred to as 566° C. resid.

The term "water" refers to the chemical compound having formula $H_2O$ and can be in a solid phase (ice), a liquid phase, or a gaseous phase (steam), depending, at least in part, on the particular process conditions, e.g., temperature and pressure.

The term "olefin product" as used herein means a product that includes an alkene, preferably a product consisting essentially of one or more alkenes. An olefin product in the meaning of this disclosure can be, for example, an ethylene stream, a propylene stream, a butylene stream, an ethylene/propylene mixture stream, and the like.

The term "aromatic" as used herein is to be understood in accordance with its art-recognized scope which includes alkyl substituted and unsubstituted mono- and polynuclear compounds.

The term "consisting essentially of" as used herein means the composition, feed, effluent, product, or other stream includes a given component at a concentration of at least 60 wt %, preferably at least 70 wt %, more preferably at least 80 wt %, more preferably at least 90 wt %, still more preferably at least 95 wt %, based on the total weight of the composition, feed, effluent, product, or other stream in question.

The term "rich" when used in phrases such as "X-rich" or "rich in X" means, with respect to an outgoing stream obtained from a device, that the stream comprises material X at a concentration higher than in the feed material fed to the same device from which the stream is derived.

The term "lean" when used in phrases such as "X-lean" or "lean in X" means, with respect to an outgoing stream obtained from a device, that the stream comprises material X at a concentration lower than in the feed material fed to the same device from which the stream is derived.

The terms "channel" and "line" are used interchangeably and mean any conduit configured or adapted for feeding, flowing, and/or discharging a gas, a liquid, and/or a fluidized solids feed into the conduit, through the conduit, and/or out of the conduit, respectively. For example, a composition can be fed into the conduit, flow through the conduit, and/or discharge from the conduit to move the composition from a first location to a second location. Suitable conduits can be or can include, but are not limited to, pipes, hoses, ducts, tubes, and the like.

As used herein, "wt %" means percentage by weight, "vol %" means percentage by volume, "mol %" means percentage by mole, "ppm" means parts per million, and "ppm wt" and "wppm" are used interchangeably to mean parts per million on a weight basis. All concentrations herein are expressed on the basis of the total amount of the composition in question, unless specified otherwise. Thus, the concentrations of the various components of the "hydrocarbon-containing feed" are expressed based on the total weight of the hydrocarbon-containing feed. All ranges expressed herein should include both end points as two specific embodiments unless specified or indicated to the contrary.

Nomenclature of elements and groups thereof used herein are pursuant to the Periodic Table used by the International Union of Pure and Applied Chemistry after 1988. An example of the Periodic Table is shown in the inner page of the front cover of Advanced Inorganic Chemistry, $6^{th}$ Edition, by F. Albert Cotton et al. (John Wiley & Sons, Inc., 1999).

The hydrocarbon-containing feed or simply the hydrocarbon feed can be, can include, or can be derived from petroleum, plastic material, natural gas condensate, landfill gas (LFG), biogas, coal, biomass, bio-based oils, rubber, or any mixture thereof. In some examples, the hydrocarbon-containing feed can include a non-volatile component. In some examples, the petroleum can be or can include any crude or any mixture thereof, any crude fraction or any mixture thereof, or any mixture of any crude with any crude fraction. A typical crude includes a mixture of hydrocarbons with varying carbon numbers and boiling points. Thus, by using conventional atmospheric distillation and vacuum distillation, one can produce a range of fuel products with varying boiling points, for example, naphtha, gasoline, kerosene, distillate, and tar. It is highly desired, however, to convert the large hydrocarbon molecules contained in the crude into more valuable, lighter products including, but not limited, to ethylene, propylene, butylenes, and the like, which can be further made into more valuable products such as polyethylene, polypropylene, ethylene-propylene copolymers, butyl rubbers, and the like.

The petroleum can be or can include: crude oil, atmospheric resid, vacuum resid, steam cracked gas oil and residue, gas oil, heating oil, hydrockrackate, atmospheric pipestill bottoms, vacuum pipestill streams including bottoms, gas oil condensate, heavy non-virgin hydrocarbon stream from refineries, vacuum gas oil, heavy gas oil, naphtha contaminated with crude, heavy residue, $C_{4'}$/residue admixture, naphtha/residue admixture, hydrocarbon gases/residue admixture, hydrogen/residue admixture, gas oil/residue admixture, or any mixture thereof. Non-limiting examples of crudes can be, or can include, but are not limited to, Tapis, Murban, Arab Light, Arab Medium, and/or Arab Heavy.

The plastic material can be, or can include, but is not limited to, polyethylene terephthalate (PETE or PET), polyethylene (PE), polypropylene (PP), polyvinyl chloride (PVC), polyvinylidene chloride (PVDC), polystyrene (PS), polycarbonate (PC), polylactic acid (PLA), acrylic (PMMA), acetal (polyoxymethylene, POM), acrylonitrile-butadiene-styrene (ABS), fiberglass, nylon (polyamides, PA), polyester (PES) rayon, polyoxybenzylmethylenglycol-anhydride (bakelite), polyurethane (PU), polyepoxide (epoxy), or any mixture thereof. The rubber can be or can include natural rubber, synthetic rubber, or a mixture thereof. The biogas can be produced via anaerobic digestion, e.g., the biogas produced during the anaerobic digestion of sewage. The biobased oil can be or can include oils that can degrade biologically over time. The biobased oil can be degraded via processes of bacterial decomposition and/or by the enzymatic biodegradation of other living organisms such as yeast, protozoans, and/or fungi. Biobased oils can be derived from vegetable oils, e.g., rapeseed oil, castor oil, palm oil, soybean oil, sunflower oil, corn oil, hemp oil, or chemically synthesized esters. The biomass can be or can include, but is not limited to, wood, agricultural residues such as straw, stover, cane trash, and green agricultural wastes, agro-industrial wastes such as sugarcane bagasse and rice husk, animal wastes such as cow manure and poultry litter, industrial waste such as black liquor from paper manufacturing, sewage, municipal solid waste, food processing waste, or any mixture thereof.

If the hydrocarbon-containing feed includes material that is solid at room temperature, e.g., plastic material, biomass, coal, rubber, etc., the solid material can be reduced to any desired particle size via well-known processes. For example, if the hydrocarbon-containing feed includes solid material, the solid material can be ground, crushed, pulverized, other otherwise reduced into particles that have any desired average particle size. In some examples, the solid matter can be reduced to an average particle size that can be submicron or from about 1 μm, about 10 μm or about 50 μm to about 100 μm, about 150 μm, or about 200 μm. For example, the average particle size of the solid material can range from about 75 μm to about 475 μm, from about 125 μm to about 425 μm, or about 175 μm to about 375 μm.

In some embodiments, the hydrocarbon-containing feed can include one or more crude oils or a fraction thereof and one or more plastic materials. In some embodiments, the hydrocarbon-containing feed can include petroleum and one or more plastic materials and the one or more plastic materials can be present in an amount in a range of from 1 wt %, 3 wt %, 5 wt %, 7 wt %, 10 wt %, or 15 wt % to 20 wt %, 25 wt %, 30 wt %, 35 wt %, 40 wt %, or 45 wt %, based on the total weight of the hydrocarbon-containing feed.

The petroleum, e.g., crude oil or fraction thereof, can act as a solvent for the plastic material and cause at least a portion of the plastic material to dissolve in the crude oil or fraction thereof. In some embodiments, at least 30 wt %, at least 40 wt %, at least 50 wt %, at least 60 wt %, at least 70 wt %, at least 80 wt %, at least 90 wt %, or even 100 wt % of the plastic material mixed with the crude oil or fraction thereof can be solubilized in the crude oil or fraction thereof. As such, in some embodiments, when the hydrocarbon-containing feed includes one or more plastic materials, the hydrocarbon-containing feed can be in the form of a solution in which the plastic material is homogeneously dispersed in the crude oil or fraction thereof.

The particles that can be used in the process for converting the hydrocarbon-containing feed by pyrolysis and gasification/combustion can be or can include, but are not limited to, silica, alumina, titania, zirconia, magnesia, pumice, ash, clay, diatomaceous earth, bauxite, spent fluidized catalytic cracker catalyst, or any mixture or combination thereof. In some embodiments, the particles can be or can include a core and at least one transition metal element and/or at least one oxidized transition metal element disposed on and/or in the core. In some embodiments, the core can be or can include, but is not limited to, silica, alumina, titania, zirconia, magnesia, pumice, ash, clay, diatomaceous earth, bauxite, spent fluidized catalytic cracker catalyst, or any mixture or combination thereof. Preferred support materials can be or can include, but are not limited to, $Al_2O_3$, $ZrO_2$, $SiO_2$, and combinations thereof, more preferably, $SiO_2$, $Al_2O_3$, or $SiO_2/Al_2O_3$.

In some embodiments, the transition metal element and/or the oxide thereof can be disposed on and/or within, e.g., within pores, of the core. In some embodiments, the transition metal element and/or the oxide thereof can form a surface layer on the core. The surface layer on the core can be continues or discontinuous. The core and/or the particles that include the at least one transition metal element and/or at least one oxidized transition metal element disposed on and/or in the core can have an average size in a range from 10 micrometers (μm), 15 μm, 25 μm, 50 μm, or 75 μm to 150 μm, 200 μm, 300 μm, 400 μm. The core and/or the particles that include the at least one transition metal element and/or at least one oxidized transition metal element disposed on and/or in the core can have a surface area in a range from 10 $m^2/g$, 50 $m^2/g$, or 100 $m^2/g$ to 200 $m^2/g$, 500 $m^2/g$, or 700 $m^2/g$.

In some embodiments, the particles can be, can include, or can otherwise be derived from spent fluid catalytic cracker ("FCC") catalyst. As such, a significant and highly advantageous use for spent FCC catalyst has been discovered because the processes disclosed herein can significantly extend the useful life of FCC catalyst in upgrading hydrocarbons long after the FCC catalyst is considered to be spent and no longer useful in the fluid catalytic cracking process.

In some embodiments, the particles can include any oxide of a transition metal element capable of converting at least a portion of any molecular hydrogen to water, e.g., via oxidation, combustion, or other mechanism, within the pyrolysis reaction zone. In some embodiments, the transition metal element can be or can include, but is not limited to, titanium, vanadium, chromium, manganese, iron, cobalt, niobium, nickel, molybdenum, tantalum, tungsten, alloys thereof, and mixtures thereof. In some examples, the transition metal element can be or can include vanadium, nickel, an alloy thereof, or a mixture thereof. The amount of optional transition metal element that can be disposed on and/or at least partially within the particles can be in a range from 500 wppm, 750 wppm, 1,000 wppm, 2,500 wppm, 5,000 wppm, or 1 wt % to 2 wt %, 5 wt %, 10 wt %, 15 wt %, 20 wt %, 30 wt %, 40 wt %, or 50 wt %, based on a total weight of the particles. In some embodiments, the amount of optional transition metal element that can be disposed on and/or at least partially within the particles can be at least 1 wt %, at least 2.5 wt %, at least 3 wt %, at least 3.5 wt %, at least 4 wt %, at least 4.5 wt %, at least 5 wt %, or at least 10 wt % up to 15 wt %, 20 wt %, 30 wt %, 40 wt %, or 50 wt %.

I. A First Aspect of this Disclosure

In a first aspect of this disclosure, a process for converting a hydrocarbon-containing feed by pyrolysis and gasification/combustion to produce upgraded hydrocarbons is disclosed. The process can include heating the hydrocarbon-containing feed, which can include $C_{5+}$ hydrocarbons and water, to produce a heated feed. The hydrocarbon-containing feed can be heated to a temperature of 200° C., 250° C., 300° C., 340° C., or 380° C. to 400° C., 500° C., 600° C., or 700° C. In some embodiments, the hydrocarbon-containing feed can be heated to a temperature of 325° C. to 450° C., or 330° C. to 425° C., or 340° C. to 400° C. A vapor fraction and a liquid fraction can be separated from the heated feed by introducing the heated feed into one or more first separation stages, e.g., a vaporization drum or a flashing drum. In some embodiments, the liquid fraction can have a cutoff point from 300° C. to 700° C., e.g., 310° C. to 550° C., as measured according to ASTM D1160-18. Suitable vaporization drums or flashing drums can include those disclosed in U.S. Pat. Nos. 7,674,366; 7,718,049; 7,993,435; 8,105, 479; and 9,777,227.

In some embodiments, at least a portion of the vapor fraction can be fed through a first pyrolysis feed inlet into a first pyrolysis zone. In other embodiments, at least a portion of the liquid fraction can be fed through a second pyrolysis feed inlet into the first pyrolysis zone. In still other embodiments, at least a portion of the vapor fraction and at least a portion of the liquid fraction can be fed through the first and second pyrolysis feed inlets, respectively, into the first pyrolysis zone. In addition to the vapor fraction and/or the liquid fraction, a first particle stream that includes particles having a pyrolysis temperature can be fed through a first particles inlet into the first pyrolysis zone. At least a portion of the particles having the pyrolysis temperature can include heated and regenerated particles recovered from a gasification/combustion zone, as described in more detail below. In some embodiments, an optional first steam stream can be fed through a first steam stream inlet into the first pyrolysis zone.

It should be understood that at least a portion and in some embodiments all of the liquid fraction can be vaporized within the first pyrolysis zone essentially immediately upon introduction of the liquid fraction into the first pyrolysis zone. The first pyrolysis zone can be operated at a significantly greater temperature than the first separation stage used to produce the vapor fraction and the liquid fraction. For example, as noted above the first separation stage can be operated at a temperature of 200° C. to 700° C., whereas as noted below the particles introduced into the first pyrolysis zone can have a pyrolysis temperature of 750° C. to 1,500° C.

The first pyrolysis zone can be located in any suitable reactor or other process environment capable of operating under the pyrolysis process conditions. In some embodiments, the first pyrolysis zone can be located in short contact time fluid bed. In some embodiments, the first pyrolysis zone can be located in a downflow reactor, an upflow reactor, a counter-current flow reactor, or vortex reactor. In a preferred embodiment, the first pyrolysis zone can be located in a downflow reactor.

The vapor fraction and/or the liquid fraction can be contacted with the particles in the first pyrolysis zone under a first set of pyrolysis conditions to effect pyrolysis of at least a portion of the hydrocarbons in the vapor fraction and/or the liquid fraction. The pyrolysis temperature of the particles can be 750° C., 800° C., 850° C., 900° C., or 950° C. to 1,050° C., 1,100° C., 1,200° C., 1,300° C., 1,400° C., or 1,500° C. In some embodiments, the pyrolysis temperature of the particles can be at least 800° C., at least 820° C., at least 840° C., at least 850° C., at least 875° C., at least 900° C., at least 950° C., or at least 975° C. to 1,000° C., 1,050° C., 1,100° C., 1,200° C., 1,300° C., or 1,400° C. In some embodiments, the first pyrolysis zone effluent can be at a temperature of 800° C., 850° C., 900° C., 925° C., or 950° C. to 975° C., 1,000° C., 1050° C., 1,100° C., or 1,150° C.

The vapor fraction and/or the liquid fraction can be contacted with an amount of the particles within the first pyrolysis zone sufficient to effect a desired level or degree of pyrolysis of the vapor fraction and/or the liquid fraction. In some embodiments, a weight ratio of the particles to a combined amount of any vapor fraction and any liquid fraction when contacted within the first pyrolysis zone can be 5, 10, 12, 15, or 20 to 25, 30, 35, 40, 45, 50, 55, or 60.

In some embodiments, the first steam stream, if present, can be introduced or otherwise fed into the first pyrolysis zone in an amount sufficient to provide a weight ratio of the steam to the vapor fraction of 0.01:1, 0.05:1, 0.1:1, 0.5:1, or 0.7:1 to 1:1, 2:1, 3:1, 4:1, 5:1, or 6:1. In other embodiments, the first steam stream, if present, can be introduced or otherwise fed into the first pyrolysis zone in an amount sufficient to provide a weight ratio of the steam to the liquid fraction (if present) of 0.05:1, 0.1:1, 0.5:1, or 0.7:1 to 1:1, 2:1, 3:1, 4:1, 5:1, or 6:1.

The vapor fraction and/or the liquid fraction can contact the particles within the first pyrolysis zone under a vacuum, at atmospheric pressure, or at a pressure greater than atmospheric pressure. In some embodiments, the vapor fraction and/or the liquid fraction can contact the particles within the first pyrolysis zone under an absolute pressure of 100 kPa, 500 kPa, 1,000 kPa, or 1,500 kPa to 3,000 kPa, 4,000 kPa, 5,000 kPa, 6,000 kPa, or 7,000 kPa. In other embodiments, the vapor fraction and/or the liquid fraction can contact the particles within the first pyrolysis zone under an absolute pressure of 100 kPa, 150 kPa, 200 kPa, 250 kPa, 300 kPa, or 400 kPa to 450 kPa, 500 kPa, 550 kPa, 600 kPa, 650 kPa, 700 kPa, 750 kPa, 800 kPa, or 840 kPa. In still other embodiments, the vapor fraction and/or the liquid fraction can contact the particles within the first pyrolysis zone under an absolute pressure of less than 800 kPa, less than 700 kPa, less than 600 kPa, less than 500 kPa, less than 450 kPa, less than 400 kPa, less than 350 kPa, less than 300 kPa, less than 250 kPa, less than 200 kPa, or less than 150 kPa.

In some embodiments, the velocity of the gaseous components within the first pyrolysis zone can be in a range of 9 m/s, 20 m/s, 50 m/s, or 75 m/s to 100 m/s, 115 m/s, 130 m/s, 155 m/s, or 175 m/s. In some embodiments, the velocity of the particles within the first pyrolysis zone can be up to 3 m/s, 5 m/s, 7 m/s, 10 m/s, 12, m/s, or 15 m/s. In some embodiments, the velocity of the gaseous components within the first pyrolysis zone can be at least 15%, at least 20%, at least 25%, at least 30%, at least 35%, at least 40%, at least 45%, or at least 50% greater than a velocity of the particles within the first pyrolysis zone.

The vapor fraction and/or the liquid fraction can contact the particles within the first pyrolysis zone for a residence time of 1 millisecond (ms), 5 ms, 10 ms, 25 ms, 50 ms, 75 ms, or 100 ms to 300 ms, 500 ms, 750 ms, 1,000 ms, 1,250 ms, 1,500 ms, 1,750 ms, or 2,000 ms. In some embodiments, the vapor fraction and/or the liquid fraction can contact the particles within the first pyrolysis zone for a residence time of 10 ms to 700 ms, 10 ms to 500 ms, 10 ms to 100 ms, 20 ms to 200 ms, 30 ms to 225 ms, 50 ms to 250 ms, 125 ms to 500 ms, 200 ms to 600 ms, or 20 ms to 140 ms. In other embodiments, the vapor fraction and/or the liquid fraction can contact the particles within the first pyrolysis zone for a residence time of less than 1,000 ms, less than 800 ms, less than 600 ms, less than 400 ms, less than 300 ms, less than 200 ms, less than 150 ms, or less than 100 ms.

During contact of the vapor fraction and/or the liquid fraction with the particles in the first pyrolysis zone, coke can be formed on the surface of the particles. For example, when the vapor fraction and/or the liquid fraction includes non-volatile components at least a portion of the non-volatile components can deposit, condense, adhere, or otherwise become disposed on the surface of the particles and/or at least partially within the particles, e.g., within pores of the particles, in the form of coke. In some embodiments, if the particles include a transition metal element, at least a portion of the transition metal element can be at a reduced state and at least a portion of the particles can include coke formed or otherwise disposed on the surface thereof and/or at least partially therein. In some embodiments, the particles in the first pyrolysis zone effluent can include 1 wt %, 3 wt %, 5 wt %, 7 wt %, 10 wt %, or 15 wt % to 20 wt %, 25 wt %, 30 wt %, 35 wt %, 40 wt %, 45 wt %, or 50 wt % of coke, based on a total weight of the particles in the pyrolysis zone effluent.

A first pyrolysis zone effluent that can include hydrocarbons, e.g., olefins, and the particles that can include coke formed thereon can be obtained from the first pyrolysis zone. In some embodiments, the first pyrolysis zone effluent can be fed from the first pyrolysis zone into one or more second separation stages configured or adapted to receive the first pyrolysis zone effluent and separate a first gaseous stream rich in the hydrocarbons, e.g., olefins, and a second particle stream rich in the particles. The second separation stage can be configured or adapted to discharge the first hydrocarbon stream and the second particle stream therefrom.

In some embodiments, at least a portion of the particles in the first pyrolysis zone effluent can optionally be stripped by contacting the particles in the first pyrolysis zone effluent with a first stripping medium within the second separation stage. For example, the first pyrolysis zone effluent can be fed from the first pyrolysis zone into the second separation stage, which can be configured or adapted to contact the first pyrolysis zone effluent or at least a portion of the particles in the first pyrolysis zone effluent with a first stripping medium, e.g., a steam stream, and separate the first pyrolysis zone effluent to obtain the first gaseous stream rich in the olefins and rich in the optional first stripping medium and the second particle stream rich in the particles. As such, in some embodiments the second separation stage can also be referred to a stripping vessel. In some embodiments, a residence time of the particles in the first pyrolysis zone effluent separated within the second separation stage from the first pyrolysis zone effluent can be in a range from 30 seconds, 1 minute, 3 minutes, 5 minutes, or 10 minutes to 15 minutes, 17 minutes, 20 minutes, 25 minutes, or longer before being discharged therefrom as the second particle stream rich in particles. In some embodiments, the optional first stripping medium can fed into the second separation stage at a weight ratio of the first stripping medium to the first pyrolysis zone effluent fed into the second separation stage in a range from 1:1,000, 2:1,000, or 2.5:1,000, or 3:1,000 to 4:1,000, 6:1,000, 8:1,000, or 10:1,000.

In some embodiments, the second separation stage can include an inertial separator configured to separate a majority of the particles from the hydrocarbons to produce the first hydrocarbon stream rich in hydrocarbons and the second particle stream rich in the particles. Inertial separators can be configured or adapted to concentrate or collect the particles by changing a direction of motion of the first pyrolysis zone effluent such that the particle trajectories cross over the hydrocarbon gas streamlines and the particles are either concentrated into a small part of the gas flow or are separated by impingement onto a surface. In some embodiments, a suitable inertial separator can include a cyclone. Illustrative cyclones can include, but are not limited to, those disclosed in U.S. Pat. Nos. 7,090,081; 7,309,383; and 9,358, 516.

In some embodiments, a residence time within the second separation stage of the hydrocarbons separated from the first pyrolysis zone effluent can be less than 1,000 ms, less than 750 ms, less than 500 ms, less than 250 ms, less than 100 ms, less than 75 ms, less than 50 ms, or less than 25 ms. In some embodiments, a residence time within the second separation stage of the hydrocarbons separated from the first pyrolysis zone effluent can be in a range from 2 ms, 4 ms, 6 ms, or 8 ms to 10 ms, 12 ms, 14 ms, 16 ms, 18 ms, or 20 ms before being discharged therefrom as the first hydrocarbon stream. In some embodiments, the residence time within the second separation stage of the hydrocarbons separated from the first pyrolysis zone effluent can be less than 20 ms, less than 15 ms, less than 10 ms, less than 7 ms, less than 5 ms, or less than 3 ms before being discharged therefrom as the first gaseous stream. The first gaseous stream, upon being discharged from the second separation stage, can be free or substantially free of any particles. In some embodiments, the first gaseous stream discharged from the second separation stage can include less than 25 wt %, less than 20 wt %, less than 15 wt %, less than 12 wt %, less than 10 wt %, less than 8 wt %, less than 6 wt %, less than 5 wt %, less than 3 wt %, or less than 1 wt % of the particles present in the first pyrolysis zone effluent.

In some embodiments, a residence time of the hydrocarbons in the first gaseous stream separated from the first pyrolysis zone effluent spanning from the initial introduction of the vapor fraction and/or the liquid fraction and the first particle stream into the first pyrolysis zone to the recovery of the first gaseous stream rich in the olefins from the second separation stage can be 5 ms, 10 ms, 25 ms, 50 ms, 75 ms, or 100 ms to 300 ms, 500 ms, 750 ms, 1,000 ms, 1,250 ms, 1,500 ms, 1,750 ms, or 2,000 ms. In other embodiments, the residence time of the hydrocarbons in the first gaseous stream separated from the first pyrolysis zone effluent spanning from the initial introduction of the vapor fraction and/or the liquid fraction and the first particle stream into the first pyrolysis zone to the recovery of the first gaseous stream rich in the olefins from the second separation stage can be less than 1,500 ms, less than 1,250 ms, less than 1,000 ms, less than 800 ms, less than 600 ms, less than 400 ms, less than 300 ms, less than 200 ms, less than 150 ms, or less than 100 ms.

At least a portion of the second particle stream, an oxidant stream, and optionally a second steam stream, optionally a fuel stream, and/or optionally a diluent stream can be fed into a gasification/combustion zone. The second particle stream, the oxidant stream, and the optional second steam stream, the optional fuel stream, and/or the optional diluent stream can be contacted within the gasification/combustion zone to effect gasification and/or combustion of at least a portion of the coke disposed on the surface of the particles to produce a gasification/combustion zone effluent that can include heated and regenerated particles and a gasification/combustion gas mixture. The reactions that can occur within the gasification/combustion zone can include, but are not limited to, combustion (C+O$_2$→CO$_2$; 2H$_2$+O$_2$→2H$_2$O), gasification (C+H$_2$O→CO+H$_2$; C+CO$_2$→2CO); and/or water gas shift reaction (CO+H$_2$O↔CO$_2$+H$_2$). As such, in some embodiments the gasification/combustion zone can be configured to produce primarily a gasification/combustion gas mixture that can include a synthesis gas that can include molecular hydrogen, carbon monoxide, and carbon dioxide. In other embodiments, the gasification/combustion zone can be configured to produce primarily a gasification/combustion gas mixture that can include a flue gas that can include nitrogen, carbon dioxide, and water.

The oxidant can be or can include molecular oxygen such as air, oxygen enriched air, oxygen depleted air, or any mixture thereof. In some embodiments, the oxidant stream can be a molecular oxygen containing gas that can have a low nitrogen content, such as oxygen from an air separation unit. In some embodiments, an oxidant stream that can include 40 vol %, 50 vol %, 60 vol %, 70 vol %, 80 vol %, 90 vol %, 95 vol %, 98 vol % or more of molecular oxygen and a nitrogen rich stream can be separated from air and the oxidant stream that includes 40 vol % or more of molecular oxygen can be introduced into the gasification/combustion zone.

The fuel can be or can include any combustible source of material capable of combusting in the presence of the oxidant stream within the gasification/combustion zone. Suitable fuels can be or can include, but are not limited to, molecular hydrogen, methane, ethane, propane, butane, natural gas, naphtha, gas oil, fuel oil, quench oil, fuel gas such as a mixture of one or more C$_1$-C$_5$ hydrocarbons, or any mixture thereof. In some embodiments, the fuel can be or can include at least a portion of the vapor fraction and/or at least a portion of the liquid fraction separated from the heated feed. The diluent can be any essentially inert gas such as carbon dioxide, molecular nitrogen, or a mixture thereof.

The gasification/combustion zone can be operated at a temperature of 1,000° C., 1,050° C., 1,100° C., 1,150° C., 1,200° C., 1,250° C., or 1,300° C. to 1,350° C., 1,400° C., 1,450° C., or 1,500° C. Operating the gasification/combustion zone at such an elevated temperature can produce heated and regenerated particles having a sufficient amount of heat that can be utilized within the first pyrolysis zone to effect the pyrolysis of the vapor fraction and/or the liquid fraction. The gasification/combustion zone can be operated at a pressure of 100 kPa-gauge, 200 kPa-gauge, 300 kPa-gauge, 400 kPa-gauge, or 500 kPa-gauge to 700 kPa-gauge, 800 kPa-gauge, 900 kPa-gauge, or 1,000 kPa-gauge.

In some embodiments, the amount of oxidant introduced into the gasification/combustion zone can be reduced or limited to a substoichiometric amount that would be needed for complete combustion of all the coke disposed on the particles and, if present, all of the hydrocarbon fuel introduced into the gasification/combustion zone. The amount of oxidant introduced into the gasification/combustion zone can be sufficient to combust a sufficient amount of the coke and, if present, optionally combust a sufficient amount of the hydrocarbon fuel to provide heat for the gasification/combustion zone and at least a portion of the heat within the pyrolysis zone via the heated and regenerated particles recycled thereto. In some embodiments, the amount of oxidant introduced into the gasification zone can be 30% to 90% or 50% to 70% of the amount of oxidant that would be required for complete combustion of all the coke formed on the surface of the particles and, if present, all of the fuel introduced into the gasification/combustion zone.

In some embodiments, when the second particle stream rich in particles includes coke disposed on and/or at least partially in the particles, at least a portion of the coke can be gasified in the gasification/combustion zone to produce the gasification/combustion gas mixture that can include molecular hydrogen, carbon monoxide, and carbon dioxide. In other embodiments, when the second particle stream rich in particles includes coke disposed on and/or at least partially in the particles, at least a portion of the coke can be combusted within the gasification/combustion zone to produce the gasification/combustion gas mixture that can include a flue gas that can include molecular nitrogen, carbon dioxide, and water. In still other embodiments, when the second particle stream rich in particles includes coke disposed on and/or at least partially in the particles, at least a portion of the coke can be gasified and at least a portion of the coke can be combusted within the gasification/combustion zone to produce the gasification/combustion gas mixture.

The heated and regenerated particles in the gasification/combustion zone effluent can include less coke as compared to the particles in the second particle stream rich in the particles or can be free of any coke. In some embodiments, the particles in the heated and regenerated particles in the gasification/combustion zone effluent can include less than 5 wt %, less than 4 wt %, less than 3 wt %, less than 2 wt %, less than 1 wt %, less than 0.5 wt %, or less than 0.1 wt % of coke.

The gasification/combustion zone effluent can be separated into a third particle stream that can be rich in the heated and regenerated particles and a second gaseous stream rich in the gasification/combustion gas mixture. In some embodiments, the gasification/combustion zone effluent can be introduced or otherwise fed into a third separation stage that can be configured to separate a majority of the heated and regenerated particles from the gaseous components to produce the gasification/combustion gas mixture and the third particle stream rich in the heated and regenerated particles. In some embodiments, the third separation stage can be or can include one or more inertial separators similar to or the same as those described above with regard to the second separation stage.

At least a portion of the third particle stream rich in the regenerated particles can be recycled or otherwise fed into the first pyrolysis zone as at least a portion of the first particle stream that can include the particles that can have the pyrolysis temperature. In some embodiments, a portion of the second gaseous stream rich in the gasification/combustion gas mixture can be fed as the diluent stream into the gasification/combustion zone.

In some embodiments, when the particles include the oxide of a transition metal element capable of oxidizing molecular hydrogen within the first pyrolysis zone, at least a portion of the transition metal element disposed on and/or in the particles in the first pyrolysis zone effluent can be at a reduced state as compared to the transition metal element in the particles fed into the first pyrolysis zone. Without wishing to be bound by theory, it is believed that when the particles include the optional oxide of the transition metal element capable of oxidizing molecular hydrogen within the first pyrolysis zone, the oxide of the transition metal element can do so via one or more processes or mechanisms. Regardless of the overall mechanism, the oxidized transition metal element can facilitate the conversion of molecular hydrogen to water and in doing so the oxidation state of the oxide of the transition metal element can be reduced. For example, if the transition metal element is vanadium, the oxide of vanadium on the fluidized particles fed into the pyrolysis reaction zone can be at an oxidation state of +5 (for example) and at least a portion of the oxide of vanadium on the fluidized particles in the pyrolysis effluent can be at an oxidation state of +4, +3, or +2. Without wishing to be bound by theory, it is also believed that one or more of the oxides of one or more transition metal elements may be capable of being reduced from an oxidized state all the way to the metallic state.

Additionally, the oxide of the transition metal element, if present, can favor the conversion, e.g., oxidation and/or combustion, of hydrogen over the oxidation and/or combustion of hydrocarbons, e.g., olefins, in the pyrolysis reaction zone. In some examples, the oxide of the transition metal element can favor the conversion of hydrogen over the conversion of hydrocarbons at a rate of 2:1, 3:1, 4:1, 5:1, 6:1, or 7:1 to 8:1, 9:1, 10:1, or 11:1.

In some embodiments, heat can be indirectly transferred from the second gaseous stream that can be rich in the gasification/combustion gas mixture to a cooling medium to produce a cooled second gaseous stream that can include water in the liquid phase. At least a portion of the water and, if present, optionally at least a portion of any regenerated particles and/or, if present, optionally at least a portion of any hydrogen sulfide can be separated from the cooled second gaseous stream to produce a purified second gaseous stream. At least a portion of the purified second gaseous stream can be compressed to produce a compressed second gaseous stream. In some embodiments, a portion of the compressed second gaseous stream can be fed to into the gasification/combustion zone as the optional diluent stream.

Returning to the first pyrolysis zone, the first pyrolysis zone can have a first end and a second end. The first particles inlet can be in proximity to or connected to the first end of the first pyrolysis zone. In some embodiments, the first pyrolysis zone effluent can exit the first pyrolysis zone from the second end. In some embodiments, the first pyrolysis feed inlet, if present, can be located downstream of the first particles inlet and upstream of the second end, the second pyrolysis feed inlet, if present, can be located downstream of the first particles inlet and upstream of the second end, and the first steam stream inlet, if present, can be located downstream of the first particles inlet and upstream of the second end. In some embodiments, when both the first pyrolysis feed inlet and the second pyrolysis feed inlet are present, the second pyrolysis feed inlet can be downstream of the first pyrolysis feed inlet. In other embodiments, when both the first pyrolysis feed inlet and the second pyrolysis feed inlet are present, the first pyrolysis feed inlet and the second pyrolysis feed inlet can be at substantially the same distance from the first end, where the second pyrolysis feed inlet can be configured to distribute the liquid fraction at a location closer to a longitudinal axis of the first pyrolysis zone than the first pyrolysis feed inlet distributes the vapor fraction. In some embodiments, when both the second pyrolysis feed inlet and the first steam stream inlet are present, the first steam stream inlet can be located upstream of the second pyrolysis feed inlet. In some embodiments, the first pyrolysis zone can include a vessel wall and the first steam feed inlet can be configured to distribute steam at a location closer to the vessel wall than the second pyrolysis feed inlet distributes the liquid fraction. In some embodiments, the first pyrolysis feed inlet can be located adjacent the first end of the first pyrolysis zone. In some embodiments, the second pyrolysis feed inlet and the first steam stream inlet can be located adjacent the second end of the first pyrolysis zone. Preferably, when the second pyrolysis feed inlet and the first steam stream inlet are located adjacent the second end of the first pyrolysis the first steam stream is just upstream of the second pyrolysis feed inlet. In some embodiments, an optional third steam stream can be injected into the liquid fraction to obtain a liquid fraction/steam mixture and the liquid/fraction/steam mixture can be fed into the first pyrolysis zone through the second pyrolysis feed inlet.

In some embodiments, at least a portion of the vapor fraction can be fed into the first pyrolysis zone as described above and at least a portion of the liquid fraction can be fed through a third pyrolysis feed inlet and a fourth particle stream that can include particles having the pyrolysis temperature can be fed through a second particles inlet into a second pyrolysis zone. A fourth steam stream can optionally be fed through a fourth steam stream inlet into the second pyrolysis zone and the liquid fraction can be contacted with the particles in the second pyrolysis zone under a second set of pyrolysis conditions to effect pyrolysis of at least a portion of the hydrocarbons in the liquid fraction. A second pyrolysis zone effluent that can include olefins and the particles, where coke can be formed on the surface of the particles can be obtained from the second pyrolysis zone. In some embodiments, a third gaseous stream rich in the olefins and a fifth particle stream rich in the particles can be obtained from the second pyrolysis zone effluent in a similar manner as the first pyrolysis zone effluent, e.g., one or more inertial separators. In other embodiments, the second pyrolysis zone effluent can be combined with the first pyrolysis zone effluent to produce a mixed pyrolysis effluent that can be separated into the second gaseous stream rich in hydrocarbons and the third particle stream rich in the particles that can include the coke disposed thereon via the second separation stage.

In some embodiments, at least a portion of the fifth particle stream, along with the second particle stream, the oxidant stream, the optional second steam stream, and/or the optional fuel stream can be fed into the gasification/combustion zone. In other embodiments, the mixed pyrolysis effluent can be separated to obtain the first gaseous stream rich in the olefins and the second particle stream rich in the particles obtained from the first pyrolysis zone effluent and the second pyrolysis zone effluent, and the second particle stream, an oxidant stream, the optional second steam stream, the optional fuel stream, and/or the optional diluent stream can be fed into the gasification/combustion zone. The particles, the oxidant stream, the optional second steam stream, the optional fuel stream, and/or the optional diluent stream can be contacted within the gasification/combustion zone to effect gasification/combustion of at least a portion of the coke disposed on the surface of the particles to produce the gasification/combustion zone effluent that can include the heated and regenerated particles and the gasification/combustion gas mixture. The second gaseous stream rich in the gasification/combustion gas mixture and the third particle stream rich in the regenerated particles can be obtained from the gasification/combustion zone effluent as described above. At least a portion of the third particle stream can be fed into the second pyrolysis zone as at least a portion of the fourth particle stream fed into the second pyrolysis zone.

The second pyrolysis zone and the second set of pyrolysis conditions therein can include those as described above with regard to the first pyrolysis zone. It should be understood that a particular value for a given pyrolysis condition in the second set of pyrolysis conditions can be different that that same pyrolysis condition in the first set of pyrolysis conditions. For example, in some embodiments, the second pyrolysis zone can be operated at a lower temperature than the first pyrolysis zone. Accordingly, the second set of pyrolysis conditions can include the weight ratio of the steam (if present) to the liquid fraction fed into the second pyrolysis zone, the operating temperature and pressure within the second pyrolysis zone, the velocity of the particles, the velocity of the gaseous components, the weight ratio of the fourth particle stream, contact time, the temperature of the second pyrolysis zone effluent, and the like can be as described above with regard to the first pyrolysis zone and can have the same values or different values as the values used in the first set of pyrolysis conditions within first pyrolysis zone. In some embodiments, no portion of the liquid fraction can be fed into the first pyrolysis zone and no portion of the vapor fraction can be fed into the second pyrolysis zone. In some embodiments, when the optional fourth steam stream is fed through the fourth steam stream inlet into the second pyrolysis zone, the fourth steam stream inlet can be downstream of the second particles inlet. In some embodiments, when the optional fourth steam stream is fed through the fourth steam stream inlet into the second pyrolysis zone, the fourth steam stream inlet can be downstream of the second particles inlet and upstream of the third pyrolysis feed inlet.

FIG. 1 depicts an illustrative system 101 for separating a hydrocarbon-containing feed in line 1001 into a vapor fraction and a liquid fraction and converting the vapor fraction and/or the liquid fraction within a pyrolysis zone 1030, according to one or more embodiments. The system 101 can include one or more heating stages 1010, one or more first separation stages 1020, one or more pyrolysis zones 1030, one or more second separation stages 1050, one or more gasification/combustion zones 1060, and one or more third separation stages 1061. The system 101 can also include one or more heat exchange stages 1070, one or more fourth separation stages 1080, and one or more compression stages 1090. The hydrocarbon containing feed via line 1001 can be fed into and heated within the heating stage 1010 to produce a heated feed in line 1015. In some embodiments, water, preferably in the form of steam, via line 1003 can be mixed, blended, or other combined with the hydrocarbon-containing feed in line 1001 to produce a hydrocarbon-containing feed and water mixture that can be heated in the heating stage 1010.

The heated feed via line 1015 can be fed into the first separation stage 1020 to obtain a vapor fraction via line 1021 and a liquid fraction via line 1023. In some embodiments, at least a portion of the vapor fraction via line 1021 can be fed through a first pyrolysis feed inlet 1031 into the pyrolysis zone 1030. In some embodiments, at least a portion of the liquid fraction via line 1023 can be fed through a second pyrolysis feed inlet 1033 and/or 1035 into the pyrolysis zone 1030. A first particle stream that can include heated particles via line 1062 can be fed through a first particles inlet 1037 into the first pyrolysis zone 1030. Optionally a first steam stream via line 1039 and/or 1041 can be fed through a first steam stream inlet 1043 and/or 1045, respectively, into the pyrolysis zone 1030. In some embodiments, the liquid fraction via line 1023 can be fed through both second pyrolysis feed inlets 1033 and 1035. In some embodiments, the first steam stream in both lines 1039 and 1041 can be fed through both first steam stream inlets 1043 and 1045, respectively.

The vapor fraction and/or the liquid fraction and optionally the steam can contact the heated particles within the pyrolysis zone 1030 to effect pyrolysis of at least a portion of the hydrocarbons in the vapor fraction and/or the liquid fraction to produce a pyrolysis zone effluent. The pyrolysis zone effluent can include olefins and particles having coke deposited or otherwise formed on a surface thereof. The pyrolysis zone effluent via line 1047 can be obtained from the pyrolysis zone 1030 and fed into the second separation stage 1050. Optionally a stripping steam stream via line 1048 can be introduced into the second separation stage 1050 to improve the separation of gaseous components that can be entrained in the particles.

A first gaseous stream rich in the olefins via line 1051 and a second particle stream rich in the particles via line 1053 can be discharged or otherwise obtained from the second separation stage 1050. In some embodiments, a portion of the particles from the pyrolysis zone effluent can be recovered via line 1055 from the second separation stage 1050 and removed from the system 101. In some embodiments, it can be desirable to remove some of the particles via line 1055 and replace the removed particles with fresh or make-up particles via line 1049. For example, should the particles accumulate too much of a transition metal on the surface thereof some of the particles can be removed while make-up particles can be introduced via line 1049 into the system 101.

The second particle stream via line 1053, an oxidant stream via line 1057, an optional steam stream via line 1058, an optional fuel stream via line 1059, and/or an optional diluent stream via line 1095 can be introduced or otherwise fed into the gasification/combustion zone 1060. The particles having the coke formed on the surface thereof, oxidant, optional steam, and optional fuel can be contacted within the gasification/combustion zone 1060 to effect gasification and/or combustion of at least a portion of the coke disposed on the surface of the particles to produce a gasification/combustion zone effluent. The gasification/combustion zone effluent can include heated and regenerated particles and a gasification/combustion gas mixture. In some embodiments, the gasification/combustion gas mixture can include molecular hydrogen, carbon monoxide, and carbon dioxide. In other embodiments, the gasification/combustion gas mixture can include a flue gas that can include nitrogen, carbon dioxide, and water.

In some embodiments, the gasification/combustion zone effluent can be fed into the third separation stage 1061 and a third particle stream that can include the heated and regenerated particles via line 1062 and a second gaseous stream rich in the gasification/combustion gas mixture via line 1063 can be recovered or otherwise obtained therefrom. The third separation stage 1061, as shown, can be disposed within the gasification/combustion zone 1060. However, the third separation stage 1061 can also be located outside the gasification/combustion zone 1060. The third separation stage 1061 can be an inertial separator or other separator as described above. In some embodiments, at least a portion of the third particle stream via line 1062 can be fed into the first pyrolysis zone 1030 as at least a portion of the first particle stream introduced thereto.

In some embodiments, the second gaseous stream via line 1063 can be introduced into the heat exchange stage 1070 to produce a cooled or quenched second gaseous stream via line 1071. The cooled second gaseous stream in line 1071 can be rich in the gasification/combustion zone mixture and can include condensed or liquid water. The second gaseous stream in line 1063 can be indirectly cooled by transferring heat from the second gaseous stream to a cooling medium, by direct contact with a cooling medium, or a combination thereof. In some embodiments, particles entrained in the second gaseous stream in line 1071 can also be present in the condensed water. The cooled second gaseous stream via line 1071 can be introduced or otherwise fed into the fourth separation stage 1080 to separate at least a portion of the condensed water and, if present, particles via line 1081.

In some embodiments, the fourth separation stage 1080 can include multiple separation stages. In some embodiments, the fourth separation stage 1080, in addition to removing the water and, if present, particles, can also include a hydrogen sulfide removal stage. As such, hydrogen sulfide, if present, can also be removed via line 1083 from the cooled second gaseous stream in the fourth separation stage 1080. A purified second gaseous steam via line 1085 can be recovered or otherwise obtained from the fourth separation stage 1080.

In some embodiments, the purified second gaseous stream via line 1085 can be introduced or otherwise fed into the compression stage 1090 to produce a compressed second gaseous stream via line 1091. In some embodiments, all or a portion of the compressed second gaseous stream in line 1091 can be removed from the system 101 via line 1093. In some embodiments, a portion of the compressed second gaseous stream in line 1091 can be introduced or otherwise fed via line 1095 to the gasification/combustion zone 1060 as the optional diluent stream.

Figure 2:
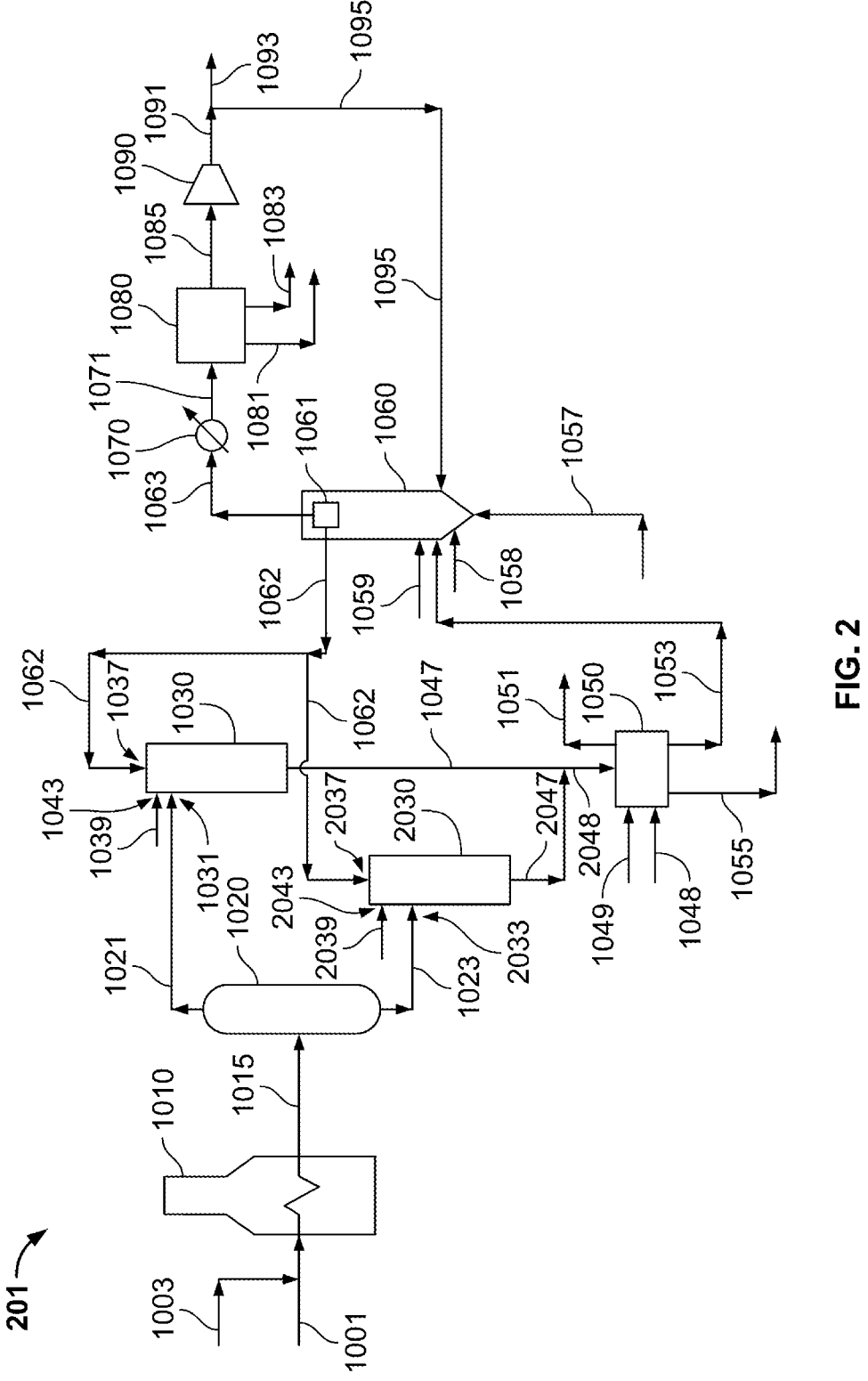
FIG. 2 depicts an illustrative system for separating a hydrocarbon-containing feed into a vapor fraction and a liquid fraction and converting the vapor fraction and the liquid fraction within separate pyrolysis zones, according to one or more embodiments described.

FIG. 2 depicts an illustrative system 201 for separating a hydrocarbon-containing feed in line 1001 into a vapor fraction and a liquid fraction and converting the vapor fraction and the liquid fraction within separate pyrolysis zones 1030 and 2030, according to one or more embodiments. The system 201 can include one or more heating stages 1010, one or more first separation stages 1020, the one or more pyrolysis zones (two are shown) 1030 and 2030, one or more second separation stages 1050, one or more gasification/combustion zones 1060, and one or more third separation stages 1061. The system 201 can also include one or more heat exchange stages 1070, one or more fourth separation stages 1080, and one or more compression stages 1090. The hydrocarbon containing feed via line 1001 can be fed into and heated within the heating stage 1010 to produce a heated feed in line 1015. In some embodiments, water, preferably in the form of steam, via line 1003 can be mixed, blended, or other combined with the hydrocarbon-containing feed in line 1001 to produce a hydrocarbon-containing feed and water mixture that can be heated in the heating stage 1010.

The heated feed via line 1015 can be fed into the separation stage 1020 to obtain the vapor fraction via line 1021 and the liquid fraction via line 1023. In some embodiments, at least a portion of the vapor fraction via line 1021 can be fed through the first pyrolysis feed inlet 1031 into the first pyrolysis zone 1030 and at least a portion of the liquid fraction via line 1023 can be fed through a third pyrolysis feed inlet 2033 into the second pyrolysis zone 2030. A first portion of the first particle stream that can include the heated particles in line 1062 can be fed through the first particles inlet 1037 into the first pyrolysis zone 1030 as the first particle stream and a second portion of the first particle stream in line 1062 can be fed through a second particles inlet 2037 into the second pyrolysis zone 2030 as a fourth particle stream. Optionally the first steam stream in line 1039 can be fed through the first steam stream inlet 1043 into the first pyrolysis zone 1030 and/or optionally a fourth steam stream in line 2039 can be fed through a fourth steam stream inlet 2043 into the second pyrolysis zone 2030.

The vapor fraction and optionally the steam can contact the heated particles within the first pyrolysis zone 1030 under a first set of pyrolysis conditions to effect pyrolysis of at least a portion of the hydrocarbons in the vapor fraction to produce the first pyrolysis zone effluent. The first pyrolysis zone effluent can include olefins and particles having coke deposited or otherwise formed on a surface thereof. The first pyrolysis zone effluent can be obtained via line 1047 from the first pyrolysis zone 1030. The liquid fraction and optionally the steam can contact the heated particles within the second pyrolysis zone 2030 under a second set of pyrolysis conditions to effect pyrolysis of at least a portion of the hydrocarbons in the liquid fraction to produce a second pyrolysis zone effluent. The second pyrolysis zone effluent can include olefins and particles having coke deposited or otherwise formed on a surface thereof. The second pyrolysis zone effluent can be obtained via line 2047 from the second pyrolysis zone 2030. In some embodiments, the first pyrolysis zone effluent in line 1047 and the second pyrolysis zone effluent in line 2047 can be combined and a mixed pyrolysis effluent via line 2048 can be introduced into the second separation stage 1050.

The system 201 can carry out the rest of the process as discussed and described above with reference to FIG. 1, where a first portion of the heated and regenerated particles via line 1062 can be introduced through the first particles inlet 1037 into the first pyrolysis zone 1030 as the first particle stream and a second portion of the heated and regenerated particles via line 1062 can be introduced through the second particles inlet 2037 into the second pyrolysis zone 2030 as the fourth particle stream.

II. A Second Aspect of this Disclosure

In a second aspect of this disclosure, a process for converting a hydrocarbon-containing feed by pyrolysis and gasification/combustion to produce upgraded hydrocarbons is disclosed. A first particle stream that can include particles at a pyrolysis temperature can be fed into a pyrolysis zone through a first particles inlet. The first particles inlet can be in proximity to or connected to a first end of the pyrolysis zone. A vapor-phase hydrocarbon-containing feed that can include hydrocarbons and optionally steam can be fed into the pyrolysis zone through a first pyrolysis feed inlet. In some embodiments, the first pyrolysis feed inlet can be located closer the first end than a second end of the pyrolysis zone. The vapor phase hydrocarbon-containing feed can be contacted with the heated particles in the pyrolysis zone to effect pyrolysis of at least a portion of the hydrocarbons in the vapor phase hydrocarbon-containing feed to produce a first pyrolysis zone effluent that can include olefins and the particles. The particles can include coke formed on the surface thereof. In some embodiments, the particles in the first pyrolysis zone effluent can include 0.01 wt %, 0.05 wt %, 0.1 wt %, 0.3 wt %, 0.5 wt %, or 0.7 wt % to 1 wt %, 2 wt %, 3 wt %, 4 wt %, 5 wt %, 6 wt %, 7 wt %, or 8 wt % of coke based on a total weight of the particles in the first pyrolysis zone effluent. In some embodiments, the steam, if present, can be present in an amount sufficient to provide a weight ratio of the steam to the vapor phase hydrocarbon-containing feed of 0.01:1, 0.05:1, 0.1:1, 0.5:1, or 0.7:1 to 1:1, 2:1, 3:1, 4:1, 5:1, or 6:1.

A liquid phase hydrocarbon-containing feed can be fed into the pyrolysis zone through a second pyrolysis feed inlet. In some embodiments, the second pyrolysis feed inlet can be located closer to the second end than the first end of the pyrolysis zone. In some embodiments, the second pyrolysis feed inlet can be downstream of the first pyrolysis feed inlet. The liquid phase hydrocarbon containing feed can be contacted with the particles to effect pyrolysis of at least a portion of the liquid phase hydrocarbon-containing feed to produce a second pyrolysis zone effluent that can include additional olefins and the particles that can include additional coke formed on the surface thereof. It should be understood that at least a portion and in some embodiments all of the liquid phase hydrocarbon-containing feed can be vaporized within the pyrolysis zone essentially immediately upon introduction of the liquid fraction into the pyrolysis zone.

In some embodiments, the vapor phase hydrocarbon-containing feed and the liquid phase hydrocarbon-containing feed can be produced by heating a $C_{5+}$ hydrocarbon-containing feed that can include water to produce a heated feed from which the vapor phase hydrocarbon-containing feed and the liquid phase hydrocarbon-containing feed can be obtained. In some embodiments, a steam stream can be fed into the pyrolysis one through a first steam stream inlet. In some embodiments, the first steam stream inlet can be located downstream of the first pyrolysis feed inlet and upstream of the second pyrolysis feed inlet. In some embodiments, the steam stream fed through the first steam stream inlet, if present, can be present in amount sufficient to provide a weight ratio of the steam to the liquid phase hydrocarbon-containing feed of 0.05:1, 0.1:1, 0.2:1, 0.5:1, or 0.7:1 to 1:1, 2:1, 3:1, 4:1, 5:1, or 6:1.

In some embodiments, the particles in the second pyrolysis zone effluent can include 1 wt %, 3 wt %, 5 wt %, 7 wt %, 10 wt %, or 15 wt % to 20 wt %, 25 wt %, 30 wt %, 35 wt %, 40 wt %, 45 wt %, or 50 wt % of coke based on a total weight of the particles in the second pyrolysis zone effluent. In some embodiments, the particles in the second pyrolysis zone effluent can include 0.1 wt %, 0.5 wt %, 1 wt %, 3 wt %, or 5 wt % to 7 wt %, 8 wt %, 9 wt %, or 10 wt % of coke based on a total weight of the particles in the second pyrolysis zone effluent.

The pyrolysis zone can be located in any suitable reactor or other process environment capable of operating under the pyrolysis process conditions. In some embodiments, the pyrolysis zone can be located in short contact time fluid bed. In some embodiments, the pyrolysis zone can be located in a downflow reactor, an upflow reactor, a counter-current flow reactor, or vortex reactor. In a preferred embodiment, the pyrolysis zone can be located in a downflow reactor.

The vapor phase hydrocarbon-containing feed and the liquid phase hydrocarbon-containing feed can be contacted with the particles in the pyrolysis zone under pyrolysis conditions to effect pyrolysis of at least a portion of the hydrocarbons in the vapor phase hydrocarbon-containing feed and the liquid phase hydrocarbon-containing feed. The pyrolysis temperature of the particles can be 750° C., 800° C., 850° C., 900° C., or 950° C. to 1,050° C., 1,100° C., 1,200° C., 1,300° C., 1,400° C., or 1,500° C. In some embodiments, the pyrolysis temperature of the particles can be at least 800° C., at least 820° C., at least 840° C., at least 850° C., at least 875° C., at least 900° C., at least 950° C., or at least 975° C. to 1,000° C., 1,050° C., 1,100° C., 1,200° C., 1,300° C., or 1,400° C. In some embodiments, the second pyrolysis zone effluent can be at a temperature of 800° C., 850° C., 900° C., 925° C., or 950° C. to 975° C., 1,000° C., 1050° C., 1,100° C., or 1,150° C. In some embodiments, the pyrolysis zone can be operated at a temperature of 750° C., 800° C., or 900° C. to 1,000° C., 1,100° C., 1,300° C., or 1,500° C. When the second pyrolysis feed inlet is downstream of the first pyrolysis feed inlet the liquid phase hydrocarbon-containing feed can be contacted with the particles at a lower temperature than the vapor phase hydrocarbon-containing feed.

The vapor phase hydrocarbon-containing feed and the liquid phase hydrocarbon-containing feed can be contacted with an amount of the particles within the pyrolysis zone sufficient to effect a desired level or degree of pyrolysis of the vapor phase hydrocarbon-containing feed and the liquid phase hydrocarbon-containing feed. In some embodiments, a weight ratio of the particles to a combined amount of the vapor phase hydrocarbon-containing feed and the liquid phase hydrocarbon-containing feed fed into the pyrolysis zone can be 5, 10, 12, 15, or 20 to 25, 30, 35, 40, 45, 50, 55, or 60.

The vapor phase hydrocarbon-containing feed and the liquid phase hydrocarbon-containing feed can contact the particles within the pyrolysis zone under a vacuum, at atmospheric pressure, or at a pressure greater than atmospheric pressure. In some embodiments, the vapor phase hydrocarbon-containing feed and the liquid phase hydrocarbon-containing feed can contact the particles within the pyrolysis zone under an absolute pressure of 100 kPa, 150 kPa, 200 kPa, 250 kPa, 300 kPa, or 400 kPa to 450 kPa, 500 kPa, 550 kPa, 600 kPa, 650 kPa, 700 kPa, 750 kPa, 800 kPa, or 840 kPa. In other embodiments, the vapor phase hydrocarbon-containing feed and the liquid phase hydrocarbon-containing feed can contact the particles within the pyrolysis zone under an absolute pressure of 100 kPa, 500 kPa, 1,000 kPa, or 1,500 kPa to 3,000 kPa, 4,000 kPa, 5,000 kPa, 6,000 kPa, or 7,000 kPa. In still other embodiments, the vapor phase hydrocarbon-containing feed and the liquid phase hydrocarbon-containing feed can contact the particles within the pyrolysis zone under an absolute pressure of less than 800 kPa, less than 700 kPa, less than 600 kPa, less than 500 kPa, less than 450 kPa, less than 400 kPa, less than 350 kPa, less than 300 kPa, less than 250 kPa, less than 200 kPa, or less than 150 kPa.

In some embodiments, the velocity of the gaseous components within the pyrolysis zone can be in a range of 9 m/s, 20 m/s, 50 m/s, or 75 m/s to 100 m/s, 115 m/s, 130 m/s, 155 m/s, or 175 m/s. In some embodiments, the velocity of the particles within the pyrolysis zone can be up to 3 m/s, 5 m/s, 7 m/s, 10 m/s, 12, m/s, or 15 m/s. In some embodiments, the velocity of the gaseous components within the pyrolysis zone can be at least 15%, at least 20%, at least 25%, at least 30%, at least 35%, at least 40%, at least 45%, or at least 50% greater than a velocity of the particles within the pyrolysis zone.

The vapor phase hydrocarbon-containing feed and the liquid phase hydrocarbon-containing feed can contact the particles within the pyrolysis zone for a residence time of 1 millisecond (ms), 5 ms, 10 ms, 25 ms, 50 ms, 75 ms, or 100 ms to 300 ms, 500 ms, 750 ms, 1,000 ms, 1,250 ms, 1,500 ms, 1,750 ms, or 2,000 ms. In some embodiments, the vapor phase hydrocarbon-containing feed and the liquid phase hydrocarbon-containing feed can contact the particles within the pyrolysis zone for a residence time of 10 ms to 700 ms, 10 ms to 500 ms, 10 ms to 100 ms, 20 ms to 200 ms, 30 ms to 225 ms, 50 ms to 250 ms, 125 ms to 500 ms, 200 ms to 600 ms, or 20 ms to 140 ms. In other embodiments, the vapor phase hydrocarbon-containing feed and the liquid phase hydrocarbon-containing feed can contact the particles within the pyrolysis zone for a residence time of less than 1,000 ms, less than 800 ms, less than 600 ms, less than 400 ms, less than 300 ms, less than 200 ms, less than 150 ms, or less than 100 ms.

As noted above, during contact of the vapor phase hydrocarbon-containing feed and the liquid phase hydrocarbon-containing feed with the particles in the pyrolysis zone, coke can be formed on the surface of the particles. For example, when the vapor phase hydrocarbon-containing feed and the liquid phase hydrocarbon-containing feed includes non-volatile components at least a portion of the non-volatile components can deposit, condense, adhere, or otherwise become disposed on the surface of the particles and/or at least partially within the particles, e.g., within pores of the particles, in the form of coke. In some embodiments, if the particles include a transition metal element, at least a portion of the transition metal element can be at a reduced state and at least a portion of the particles can include coke formed or otherwise disposed on the surface thereof and/or at least partially therein.

In some embodiments, a first quench medium that can include one or more reactive hydrocarbons can be fed into the pyrolysis zone through a first quench medium inlet. The first quench medium inlet can be located downstream of the second pyrolysis feed inlet and upstream of the second end of the pyrolysis zone. The second pyrolysis zone effluent can be at a temperature sufficient to effect pyrolysis of at least a portion of the one or more reactive hydrocarbons in the first quench medium. In some embodiments, introducing the first quench medium into the pyrolysis zone can produce a cooled or first cooled pyrolysis zone effluent that can be obtained from the pyrolysis zone.

The second pyrolysis zone effluent that can include hydrocarbons, e.g., olefins, and the particles that can include coke formed thereon can be obtained from the pyrolysis zone. In some embodiments, the second pyrolysis zone effluent can be fed from the pyrolysis zone into one or more separation stages configured or adapted to receive the second pyrolysis zone effluent and separate a first gaseous stream rich in the hydrocarbons, e.g., olefins, and a second particle stream rich in the particles. In some embodiments, the first gaseous stream can include, on a volume basis, ≥3%, ≥5%, ≥7%, ≥10%, ≥12%, or ≥15% of a combined amount of carbon monoxide and carbon dioxide. The second separation stage can be configured or adapted to discharge the first hydrocarbon stream and the second particle stream therefrom.

In some embodiments, the first gaseous stream rich in the hydrocarbons can be contacted with a second quench medium that can include one or more reactive hydrocarbons. The first gaseous stream can be at a temperature sufficient to effect pyrolysis of at least a portion of the one or more reactive hydrocarbons. In other embodiments, a third quench medium that can include one or more reactive hydrocarbons can be contacted with the second pyrolysis zone effluent or the first cooled pyrolysis zone effluent after exiting the pyrolysis zone and before being fed to the separation stage. The second pyrolysis zone effluent can be at a temperature sufficient to effect pyrolysis of at least a portion of the one or more reactive hydrocarbons in the third quench medium. In some embodiments, the second pyrolysis zone effluent and/or the first gaseous stream can independently be at a temperature of 800° C., 850° C., or 900° C., to 1,000° C., 1,050° C., or 1,100° C. The first, second, and third quench mediums can independently be or include, but are not limited to, ethane, propane, butane, and any mixture thereof.

In some embodiments, at least a portion of the particles in the second pyrolysis zone effluent can optionally be stripped by contacting the particles in the second pyrolysis zone effluent with a first stripping medium within the separation stage. For example, the second pyrolysis zone effluent can be fed from the pyrolysis zone into the separation stage, which can be configured or adapted to contact the second pyrolysis zone effluent or at least at portion of the particles in the second pyrolysis zone effluent with a first stripping medium, e.g., a steam stream, and separate the second pyrolysis zone effluent to obtain the first gaseous stream rich in the olefins and rich in the optional first stripping medium and the second particle stream rich in the particles. As such, in some embodiments the second separation stage can also be referred to a stripping vessel. In some embodiments, a residence time of the particles in the second pyrolysis zone effluent separated within the separation stage from the second pyrolysis zone effluent can be in a range from 30 seconds, 1 minute, 3 minutes, 5 minutes, or 10 minutes to 15 minutes, 17 minutes, 20 minutes, 25 minutes, or longer before being discharged therefrom as the second particle stream rich in the particles. In some embodiments, the optional first stripping medium can fed into the separation stage at a weight ratio of the first stripping medium to the second pyrolysis zone effluent fed into the separation stage in a range from 1:1,000, 2:1,000, or 2.5:1,000, or 3:1,000 to 4:1,000, 6:1,000, 8:1,000, or 10:1,000.

In some embodiments, the separation stage can include an inertial separator configured to separate a majority of the particles from the hydrocarbons to produce the first gaseous stream rich in hydrocarbons and the second particle stream rich in the particles. Inertial separators can be configured or adapted to concentrate or collect the particles by changing a direction of motion of the second pyrolysis zone effluent such that the particle trajectories cross over the hydrocarbon gas streamlines and the particles are either concentrated into a small part of the gas flow or are separated by impingement onto a surface. In some embodiments, a suitable inertial separator can include a cyclone. Illustrative cyclones can include, but are not limited to, those disclosed in U.S. Pat. Nos. 7,090,081; 7,309,383; and 9,358,516.

In some embodiments, a residence time within the separation stage of the hydrocarbons separated from the second pyrolysis zone effluent can be less than 1,000 ms, less than 750 ms, less than 500 ms, less than 250 ms, less than 100 ms, less than 75 ms, less than 50 ms, or less than 25 ms. In some embodiments, a residence time within the separation stage of the hydrocarbons separated from the second pyrolysis zone effluent can be in a range from 2 ms, 4 ms, 6 ms, or 8 ms to 10 ms, 12 ms, 14 ms, 16 ms, 18 ms, or 20 ms before being discharged therefrom as the first gaseous stream. In some embodiments, the residence time within the separation stage of the hydrocarbons separated from the second pyrolysis zone effluent can be less than 20 ms, less than 15 ms, less than 10 ms, less than 7 ms, less than 5 ms, or less than 3 ms before being discharged therefrom as the first gaseous stream. The first gaseous stream, upon being discharged from the separation stage, can be free or substantially free of any particles. In some embodiments, the first gaseous stream discharged from the separation stage can include less than 25 wt %, less than 20 wt %, less than 15 wt %, less than 12 wt %, less than 10 wt %, less than 8 wt %, less than 6 wt %, less than 5 wt %, less than 3 wt %, or less than 1 wt % of the particles present in the second pyrolysis zone effluent.

In some embodiments, a residence time of the hydrocarbons in the first gaseous stream separated from the second pyrolysis zone effluent spanning from the initial introduction of the vapor phase hydrocarbon-containing feed into the pyrolysis zone to the recovery of the first gaseous stream rich in the hydrocarbons from the separation stage can be 5 ms, 10 ms, 25 ms, 50 ms, 75 ms, or 100 ms to 300 ms, 500 ms, 750 ms, 1,000 ms, 1,250 ms, 1,500 ms, 1,750 ms, or 2,000 ms. In other embodiments, the residence time of the hydrocarbons in the first gaseous stream separated from the second pyrolysis zone effluent spanning from the initial introduction of the vapor phase hydrocarbon-containing feed into the pyrolysis zone to the recovery of the first gaseous stream rich in the olefins from the separation stage can be less than 1,500 ms, less than 1,250 ms, less than 1,000 ms, less than 800 ms, less than 600 ms, less than 400 ms, less than 300 ms, less than 200 ms, less than 150 ms, or less than 100 ms.

The second particle stream can be further processed in a similar manner as described above with regard to the first aspect of this disclosure. More particularly, at least a portion of the second particle stream, an oxidant stream, an optional steam stream, and/or an optional fuel stream can be fed into a gasification/combustion zone. The second particle stream, the oxidant stream, and the optional steam stream and/or the optional fuel stream can be contacted within the gasification/combustion zone to effect gasification/combustion of at least a portion of the coke disposed on the surface of the particle to produce a gasification/combustion zone effluent that can include heated and regenerated particles and a gasification/combustion gas mixture. In some embodiments the gasification/combustion zone can be configured to produce primarily a gasification/combustion gas mixture that can include a synthesis gas that can include molecular hydrogen, carbon monoxide, and carbon dioxide. In other embodiments, the gasification/combustion zone can be configured to produce primarily a gasification/combustion gas mixture that can include a flue gas that can include nitrogen, carbon dioxide, and water.

A second gaseous stream rich in the gasification/combustion gas mixture and a third particle stream rich in the heated and regenerated particles can be obtained from the gasification/combustion zone effluent. At least a portion of the third particle stream can be fed into the pyrolysis zone as at least a portion of the first particle stream. The second gaseous stream can be further processed to produce the cooled second gaseous stream, the purified second gaseous stream, and the compressed second gaseous stream. In some embodiments, a portion of the compressed second gaseous stream can be introduced into the gasification/combustion zone as the optional diluent.

Figure 3:
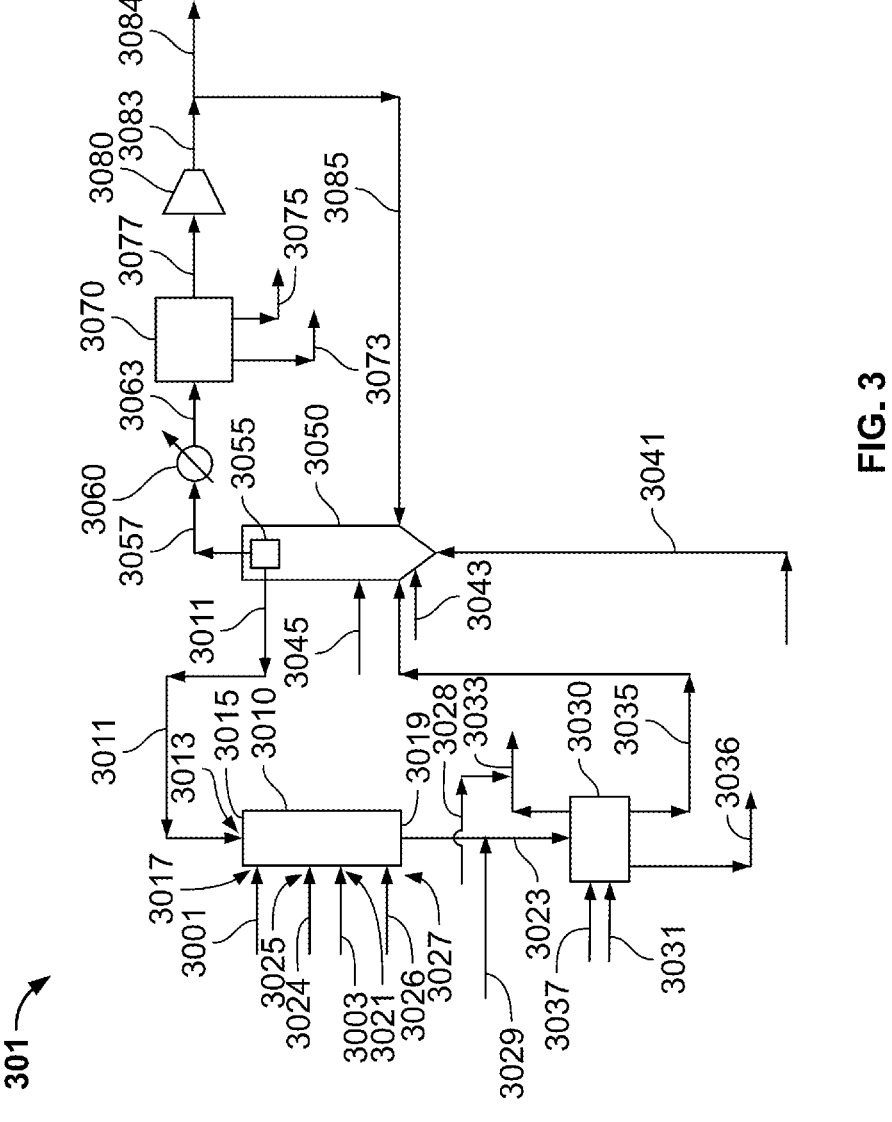
FIG. 3 depicts an illustrative system for converting a vapor phase hydrocarbon-containing feed and a liquid phase hydrocarbon-containing feed within a pyrolysis zone, according to one or more embodiments described.

FIG. 3 depicts an illustrative system 301 for converting a vapor phase hydrocarbon-containing feed in line 3001 and a liquid phase hydrocarbon-containing feed in line 3003 within a pyrolysis zone 3010, according to one or more embodiments. The system 301 can include one or more pyrolysis zones 3010, one or more separation stages or first separation stages 3030, one or more gasification/combustion zones 3050, and one or more second separation stages 3055. The system 301 can also include one or more heat exchange stages 3060, one or more third separation stages 3070, and one or more compression stages 3080. A first particle stream via line 3011 that can include particles at a pyrolysis temperature can be fed into the pyrolysis zone 3010 through a particles inlet 3013. The particles inlet 3013 can be in proximity to or connected to a first end 3015 of the pyrolysis zone 3010. The vapor phase hydrocarbon-containing feed via line 3001 can be fed into the pyrolysis zone through a first pyrolysis feed inlet 3017. The vapor phase hydrocarbon-containing feed in line 3001 can include hydrocarbons and steam. The first pyrolysis feed inlet 3017 can be located closer to the first end 3015 of the pyrolysis zone than a second end 3019 of the pyrolysis zone 3010. The vapor phase hydrocarbon-containing feed and the particles can be contacted in the pyrolysis zone 3010 to effect pyrolysis of at least a portion of the hydrocarbons in the vapor phase hydrocarbon-containing feed to produce a first pyrolysis zone effluent. The first pyrolysis zone effluent can include olefins and the particles. Coke can be formed on the surface of the particles.

The liquid phase hydrocarbon-containing feed via line 3003 can be fed into the pyrolysis zone 3010 through a second pyrolysis feed inlet 3021. The second pyrolysis feed inlet 3021 can be located closer to the second end 3019 than the first end 3015 of the pyrolysis zone 3010. The second pyrolysis feed inlet 3021 can be downstream of the first pyrolysis feed inlet 3017. The liquid phase hydrocarbon-containing feed and the particles can be contacted in the pyrolysis zone to effect pyrolysis of at least a portion of the liquid phase hydrocarbon-containing feed to produce a second pyrolysis zone effluent. The second pyrolysis zone effluent can include additional olefins and the particles. The particles in the second pyrolysis zone effluent can include additional coke formed on the surface thereof. In some embodiments, an optional steam stream via line 3024 can be fed into the pyrolysis zone 3010 through a first steam stream inlet 3025. The first steam stream inlet 3025 can be located downstream of the first pyrolysis feed 3017 inlet and upstream of the second pyrolysis feed inlet 3021.

In some embodiments, a first quench medium that can include one or more reactive hydrocarbons via line 3026 can be fed into the pyrolysis zone 3010 through a quench medium inlet 3027. The quench medium inlet 3027 can be located downstream of the second pyrolysis feed inlet 3021 and upstream of the second end 3019 of the pyrolysis zone 3010. The second pyrolysis zone effluent can be at a temperature sufficient to effect pyrolysis of at least a portion of the one or more reactive hydrocarbons in the first quench medium.

The second pyrolysis effluent via line 3023 can be obtained from the pyrolysis zone 3010 and fed into the first separation stage 3030. Optionally a stripping steam stream via line 3031 can be introduced into the first separation stage 3030 to improve the separation of gaseous components that can be entrained in the particles. A first gaseous stream rich in the olefins via line 3033 and a second particle stream rich in the particles via line 3035 can be obtained from the first separation stage 3030. In some embodiments, a portion of the particles from the second pyrolysis zone effluent can be recovered via line 3036 from the first separation stage 3030 and removed from the system 301. In some embodiments, it can be desirable to remove some of the particles via line 3036 and replace the removed particles with fresh or make-up particles via line 3037. For example, should the particles accumulate too much of a transition metal on the surface thereof some of the particles can be removed via line 3036 while make-up particles can be introduced via line 3037 into the system 301.

In some embodiments, the first gaseous stream rich in the hydrocarbons in line 3033 can be contacted with a second quench medium that can include one or more reactive hydrocarbons in line 3028. The first gaseous stream in line 3033 can be at a temperature sufficient to effect pyrolysis of at least a portion of the one or more reactive hydrocarbons in the second quench medium. In other embodiments, a third quench medium that can include one or more reactive hydrocarbons in line 3029 can be contacted with the second pyrolysis zone effluent in line 3023 after exiting the pyrolysis zone 3010 and before being fed into the separation stage 3030. The second pyrolysis zone effluent in line 3023 can be at a temperature sufficient to effect pyrolysis of at least a portion of the one or more reactive hydrocarbons in the third quench medium. In some embodiments, the second pyrolysis zone effluent in line 3023 and/or the first gaseous stream in line 3033 can independently be at a temperature of 800° C., 850° C., or 900° C., to 1,000° C., 1,050° C., or 1,100° C. The first, second, and third quench mediums in lines 3026, 3028, and 3029, respectively, can independently be or include, but are not limited to, ethane, propane, butane, and any mixture thereof.

The second particle stream via line 3035, an oxidant stream via line 3041, an optional steam stream via line 3043, an optional fuel stream via line 3045, and/or an optional diluent stream via line 3085 can be introduced or otherwise fed into the gasification/combustion zone 3050. The particles having the coke formed on the surface thereof, oxidant, optional steam, and optional fuel can be contacted within the gasification/combustion zone 3050 to effect gasification and/or combustion of at least a portion of the coke disposed on the surface of the particles to produce a gasification/combustion zone effluent. The gasification/combustion zone effluent can include heated and regenerated particles and a gasification/combustion gas mixture. In some embodiments, the gasification/combustion gas mixture can include molecular hydrogen, carbon monoxide, and carbon dioxide. In other embodiments, the gasification/combustion gas mixture can include a flue gas that can include nitrogen, carbon dioxide, and water.

In some embodiments, the gasification/combustion zone effluent can be fed into the third separation stage 3055 and a third particle stream that can include the heated and regenerated particles via line 3011 and a second gaseous stream rich in the gasification/combustion gas mixture via line 3057 can be recovered or otherwise obtained therefrom. The third separation stage 3055, as shown, can be disposed within the gasification/combustion zone 3050. However, the third separation stage 3055 can also be located outside the gasification/combustion zone 3050. The third separation stage 3055 can be an inertial separator or other separator as described above. In some embodiments, at least a portion of the third particle stream via line 3011 can be fed into the pyrolysis zone 3010 as at least a portion of the first particle stream introduced thereto.

In some embodiments, the second gaseous stream via line 3057 can be fed into the heat exchange stage 3060 to produce a cooled or quenched second gaseous stream via line 3063. The cooled second gaseous stream in line 3063 can be rich in the gasification/combustion zone mixture and can include condensed or liquid water. The second gaseous stream in line 3063 can be indirectly cooled by transferring heat from the second gaseous stream to a cooling medium, by direct contact with a cooling medium, or a combination thereof. In some embodiments, at least a portion of any particles entrained in the second gaseous stream in line 3057 can also be present in the condensed water. The cooled second gaseous stream via line 3063 can be introduced or otherwise fed into the third separation stage 3070 to separate at least a portion of the condensed water and, if present, particles via line 3073.

In some embodiments, the third separation stage 3070 can include multiple separation stages. In some embodiments, the third separation stage 3070, in addition to removing the water and, if present, particles, can also include a hydrogen sulfide removal stage. As such, hydrogen sulfide, if present, can also be removed via line 3075 from the cooled second gaseous stream in the third separation stage 3070. A purified second gaseous steam via line 3077 can be recovered or otherwise obtained from the third separation stage 3070.

In some embodiments, the purified second gaseous stream via line 3077 can be introduced or otherwise fed into the compression stage 3080 to produce a compressed second gaseous stream via line 3083. In some embodiments, all or a portion of the compressed second gaseous stream in line 3083 can be removed from the system 301 via line 3084. In some embodiments, a first portion of the compressed second gaseous stream in line 3083 can be introduced or otherwise fed via line 3085 to the gasification/combustion zone 3050 as the optional diluent stream and a second portion via line 3084 can be removed from the system 301.

III. A Third Aspect of this Disclosure

In a third aspect of this disclosure, a process for converting a hydrocarbon-containing feed by pyrolysis and gasification/combustion to produce upgraded hydrocarbons is disclosed. The hydrocarbon-containing feed can be fed through a hydrocarbon feed inlet into a pyrolysis zone and a first particle stream that can include heated particles can be fed through a first particle inlet into the pyrolysis zone. The hydrocarbon-containing feed can be contacted with the heated particles in the pyrolysis zone to effect pyrolysis of at least a portion of the hydrocarbon-containing feed to produce a pyrolysis zone effluent that can include olefins and the particles. Coke can be formed on the surface of the particles. In some embodiments, the particles in the pyrolysis zone effluent can include 1 wt %, 3 wt %, 5 wt %, 7 wt %, 10 wt %, or 15 wt % to 20 wt %, 25 wt %, 30 wt %, 35 wt %, 40 wt %, 45 wt %, or 50 wt % of coke based on a total weight of the particles in the pyrolysis zone effluent. In some embodiments, the particles in the pyrolysis zone effluent can include 0.1 wt %, 0.5 wt %, 1 wt %, 3 wt %, or 5 wt % to 7 wt %, 8 wt %, 9 wt %, or 10 wt % of coke based on a total weight of the particles in the pyrolysis zone effluent.

In some embodiments, the hydrocarbon-containing feed can include one or more hydrocarbons in vapor phase immediately before entering the pyrolysis zone and optionally steam. In some embodiments, the hydrocarbon-containing feed can include or consist essentially of hydrocarbons in liquid phase immediately before entering the pyrolysis zone and optionally liquid water and/or steam. In some embodiments, a first hydrocarbon-containing feed that can include hydrocarbons in vapor phase immediately before entering the pyrolysis zone and optionally steam can be fed into the pyrolysis zone through a first pyrolysis feed inlet and a second hydrocarbon-containing feed that can include hydrocarbons in liquid phase immediately before entering the pyrolysis zone and optionally liquid water and/or steam can be fed into the pyrolysis zone through a second pyrolysis feed inlet. In some embodiments, the first hydrocarbon-containing feed and the second hydrocarbon-containing feed can be produced by heating a $C_{5+}$ hydrocarbon-containing feed that can include water to produce a heated feed and obtaining from the heated feed the first hydrocarbon-containing feed and the second hydrocarbon-containing feed. In some embodiments, a steam stream can be fed into the pyrolysis zone through a steam inlet into the pyrolysis zone. In some embodiments, the steam inlet, if present, can be upstream of the second pyrolysis feed inlet.

The pyrolysis zone can be located in any suitable reactor or other process environment capable of operating under the pyrolysis process conditions. In some embodiments, the pyrolysis zone can be located in short contact time fluid bed. In some embodiments, the pyrolysis zone can be located in a downflow reactor, an upflow reactor, a counter-current flow reactor, or vortex reactor. In a preferred embodiment, the pyrolysis zone can be located in a downflow reactor.

The heated particles can have a temperature of 750° C., 800° C., 850° C., 900° C., or 950° C. to 1,050° C., 1,100° C., 1,200° C., 1,300° C., 1,400° C., or 1,500° C. In some embodiments, the heated particles can have a temperature of at least 800° C., at least 820° C., at least 840° C., at least 850° C., at least 875° C., at least 900° C., at least 950° C., or at least 975° C. to 1,000° C., 1,050° C., 1,100° C., 1,200° C., 1,300° C., or 1,400° C. In some embodiments, the pyrolysis zone effluent can be at a temperature of 800° C., 850° C., 900° C., 925° C., or 950° C. to 975° C., 1,000° C., 1050° C., 1,100° C., or 1,150° C. The hydrocarbon-containing feed can be contacted with an amount of the particles within the pyrolysis zone sufficient to effect a desired level or degree of pyrolysis of the hydrocarbon-containing feed. In some embodiments, a weight ratio of the particles to the hydrocarbon-containing feed fed into the pyrolysis zone can be 5, 10, 12, 15, or 20 to 25, 30, 35, 40, 45, 50, 55, or 60.

The hydrocarbon-containing feed can contact the particles within the pyrolysis zone under a vacuum, at atmospheric pressure, or at a pressure greater than atmospheric pressure. In some embodiments, the hydrocarbon-containing feed can contact the particles within the pyrolysis zone under an absolute pressure of 100 kPa, 150 kPa, 200 kPa, 250 kPa, 300 kPa, or 400 kPa to 450 kPa, 500 kPa, 550 kPa, 600 kPa, 650 kPa, 700 kPa, 750 kPa, 800 kPa, or 840 kPa. In other embodiments, hydrocarbon-containing feed can contact the particles within the pyrolysis zone under an absolute pressure of 100 kPa, 500 kPa, 1,000 kPa, or 1,500 kPa to 3,000 kPa, 4,000 kPa, 5,000 kPa, 6,000 kPa, or 7,000 kPa. In still other embodiments, the hydrocarbon-containing feed can contact the particles within the pyrolysis zone under an absolute pressure of less than 800 kPa, less than 700 kPa, less than 600 kPa, less than 500 kPa, less than 450 kPa, less than 400 kPa, less than 350 kPa, less than 300 kPa, less than 250 kPa, less than 200 kPa, or less than 150 kPa.

In some embodiments, the velocity of the gaseous components within the pyrolysis zone can be in a range of 9 m/s, 20 m/s, 50 m/s, or 75 m/s to 100 m/s, 115 m/s, 130 m/s, 155 m/s, or 175 m/s. In some embodiments, the velocity of the particles within the pyrolysis zone can be up to 3 m/s, 5 m/s, 7 m/s, 10 m/s, 12, m/s, or 15 m/s. In some embodiments, the velocity of the gaseous components within the pyrolysis zone can be at least 15%, at least 20%, at least 25%, at least 30%, at least 35%, at least 40%, at least 45%, or at least 50% greater than a velocity of the particles within the pyrolysis zone.

The hydrocarbon-containing feed can contact the particles within the pyrolysis zone for a residence time of 1 millisecond (ms), 5 ms, 10 ms, 25 ms, 50 ms, 75 ms, or 100 ms to 300 ms, 500 ms, 750 ms, 1,000 ms, 1,250 ms, 1,500 ms, 1,750 ms, or 2,000 ms. In some embodiments, the hydrocarbon-containing feed can contact the particles within the pyrolysis zone for a residence time of 10 ms to 700 ms, 10 ms to 500 ms, 10 ms to 100 ms, 20 ms to 200 ms, 30 ms to 225 ms, 50 ms to 250 ms, 125 ms to 500 ms, 200 ms to 600 ms, or 20 ms to 140 ms. In other embodiments, the hydrocarbon-containing feed can contact the particles within the pyrolysis zone for a residence time of less than 1,000 ms, less than 800 ms, less than 600 ms, less than 400 ms, less than 300 ms, less than 200 ms, less than 150 ms, or less than 100 ms.

As noted above, during contact of the hydrocarbon-containing feed with the particles in the pyrolysis zone, coke can be formed on the surface of the particles. For example, when the vapor phase hydrocarbon-containing feed and the liquid phase hydrocarbon-containing feed includes non-volatile components at least a portion of the non-volatile components can deposit, condense, adhere, or otherwise become disposed on the surface of the particles and/or at least partially within the particles, e.g., within pores of the particles, in the form of coke. In some embodiments, if the particles include a transition metal element, at least a portion of the transition metal element can be at a reduced state and at least a portion of the particles can include coke formed or otherwise disposed on the surface thereof and/or at least partially therein.

The pyrolysis zone effluent that can include hydrocarbons, e.g., olefins, and the particles that can include coke formed thereon can be obtained from the pyrolysis zone. In some embodiments, the pyrolysis zone effluent can be fed from the pyrolysis zone into one or more first separation stages configured or adapted to receive the pyrolysis zone effluent and separate a first gaseous stream rich in the hydrocarbons, e.g., olefins, and a second particle stream rich in the particles. In some embodiments, the first gaseous stream can include, on a volume basis, ≥3%, ≥5%, 27%, ≥10%, ≥12%, or ≥15% of a combined amount of carbon monoxide and carbon dioxide. The first separation stage can be configured or adapted to discharge the first gaseous stream and the second particle stream therefrom.

In some embodiments, at least a portion of the particles in the pyrolysis zone effluent can optionally be stripped by contacting the particles in the first pyrolysis zone effluent with a stripping medium within the first separation stage. For example, the second pyrolysis zone effluent can be fed from the pyrolysis zone into the first separation stage, which can be configured or adapted to contact the pyrolysis zone effluent or at least at portion of the particles in the pyrolysis zone effluent with the stripping medium, e.g., a steam stream, and separate the pyrolysis zone effluent to obtain the first gaseous stream rich in the olefins and rich in the optional first stripping medium and the second particle stream rich in the particles. As such, in some embodiments the first separation stage can also be referred to a stripping vessel. In some embodiments, a residence time of the particles in the pyrolysis zone effluent separated within the separation stage from the second pyrolysis zone effluent can be in a range from 30 seconds, 1 minute, 3 minutes, 5 minutes, or 10 minutes to 15 minutes, 17 minutes, 20 minutes, 25 minutes, or longer before being discharged therefrom as the second particle stream rich in the particles. In some embodiments, the optional stripping medium can fed into the first separation stage at a weight ratio of the stripping medium to the pyrolysis zone effluent fed into the separation stage in a range from 1:1,000, 2:1,000, or 2.5:1,000, or 3:1,000 to 4:1,000, 6:1,000, 8:1,000, or 10:1,000.

In some embodiments, the first separation stage can include an inertial separator configured to separate a majority of the particles from the hydrocarbons to produce the first gaseous stream rich in hydrocarbons and the second particle stream rich in the particles. Inertial separators can be configured or adapted to concentrate or collect the particles by changing a direction of motion of the pyrolysis zone effluent such that the particle trajectories cross over the hydrocarbon gas streamlines and the particles are either concentrated into a small part of the gas flow or are separated by impingement onto a surface. In some embodiments, a suitable inertial separator can include a cyclone. Illustrative cyclones can include, but are not limited to, those disclosed in U.S. Pat. Nos. 7,090,081; 7,309,383; and 9,358,516.

In some embodiments, a residence time within the first separation stage of the hydrocarbons separated from the pyrolysis zone effluent can be less than 1,000 ms, less than 750 ms, less than 500 ms, less than 250 ms, less than 100 ms, less than 75 ms, less than 50 ms, or less than 25 ms. In some embodiments, a residence time within the separation stage of the hydrocarbons separated from the pyrolysis zone effluent can be in a range from 2 ms, 4 ms, 6 ms, or 8 ms to 10 ms, 12 ms, 14 ms, 16 ms, 18 ms, or 20 ms before being discharged therefrom as the first gaseous stream. In some embodiments, the residence time within the separation stage of the hydrocarbons separated from the pyrolysis zone effluent can be less than 20 ms, less than 15 ms, less than 10 ms, less than 7 ms, less than 5 ms, or less than 3 ms before being discharged therefrom as the first gaseous stream. The first gaseous stream, upon being discharged from the separation stage, can be free or substantially free of any particles. In some embodiments, the first gaseous stream discharged from the separation stage can include less than 25 wt %, less than 20 wt %, less than 15 wt %, less than 12 wt %, less than 10 wt %, less than 8 wt %, less than 6 wt %, less than 5 wt %, less than 3 wt %, or less than 1 wt % of the particles present in the second pyrolysis zone effluent.

In some embodiments, a residence time of the hydrocarbons in the first gaseous stream separated from the pyrolysis zone effluent spanning from the initial introduction of the hydrocarbon-containing feed into the pyrolysis zone to the recovery of the first gaseous stream rich in the hydrocarbons from the first separation stage can be 5 ms, 10 ms, 25 ms, 50 ms, 75 ms, or 100 ms to 300 ms, 500 ms, 750 ms, 1,000 ms, 1,250 ms, 1,500 ms, 1,750 ms, or 2,000 ms. In other embodiments, the residence time of the hydrocarbons in the first gaseous stream separated from the pyrolysis zone effluent spanning from the initial introduction of the hydrocarbon-containing feed into the pyrolysis zone to the recovery of the first gaseous stream rich in the olefins from the first separation stage can be less than 1,500 ms, less than 1,250 ms, less than 1,000 ms, less than 800 ms, less than 600 ms, less than 400 ms, less than 300 ms, less than 200 ms, less than 150 ms, or less than 100 ms.

In some embodiments in the third aspect of this disclosure, a first quench medium stream that can include one or more reactive hydrocarbons can be fed through a first quench medium inlet into the pyrolysis zone. The first quench medium inlet can be located downstream of the hydrocarbon feed inlet. At least a portion of the one or more reactive hydrocarbons can undergo pyrolysis. In some embodiments, the pyrolysis zone can be at a temperature of 800° C. 900° C. or 1,000° C. to 1,050° C., 1,150, or 1,250° C. at the location the first quench medium can be introduced into pyrolysis zone. A cooled or first cooled pyrolysis zone effluent can be obtained from the pyrolysis zone. The cooled pyrolysis zone effluent obtained from the pyrolysis zone can be at a temperature of 600° C., 650° C., or 700° C. to 800° C., 850° C., or 900° C. A first gaseous stream rich in the olefins and a second particle stream rich in the particles can be obtained from the cooled or first cooled pyrolysis zone effluent.

In other embodiments in the third aspect of this disclosure, the pyrolysis zone effluent after exiting the pyrolysis zone can be contacted with a second quench medium that can include one or more reactive hydrocarbons to produce a cooled or second cooled pyrolysis zone effluent. The pyrolysis zone effluent or the first cooled pyrolysis zone effluent can be at a temperature sufficient to effect pyrolysis of at least a portion of the one or more reactive hydrocarbons in the second quench medium. In some embodiments, the pyrolysis zone effluent or the first cooled pyrolysis zone effluent can be at a temperature of 800° C., 900° C., or 1,000° C. to 1,050° C., 1,150, or 1,250° C. when contacted with the second quench medium. The cooled or the second cooled pyrolysis zone effluent can be at a temperature of 600° C., 650° C., or 700° C. to 800° C., 850° C., or 900° C. A first gaseous stream rich in the olefins and a second particle stream rich in the particles can be obtained from the cooled or the second cooled pyrolysis zone effluent. The first gaseous stream rich in the olefins and the second particle stream rich in the particles can be obtained from the cooled pyrolysis zone effluent.

In other embodiments in the third aspect of this disclosure, the first gaseous stream rich in the olefins and the second particle stream rich in the particles can be obtained from the pyrolysis zone effluent, the first cooled pyrolysis zone effluent, and/or the second cooled pyrolysis zone effluent. The first gaseous stream can be contacted with a third quench medium that can include one or more reactive hydrocarbons to produce a cooled first gaseous stream. The first gaseous stream can be at a temperature sufficient to effect pyrolysis of at least a portion of the one or more reactive hydrocarbons in the third quench medium. In some embodiments, the first gaseous stream can be at a temperature of 800° C., 900° C., or 1,000° C. to 1,050° C., 1,150, or 1,250° C. when contacted with the third quench medium. The cooled first gaseous stream can be at a temperature of 600° C., 650° C., or 700° C. to 800° C., 850° C., or 900° C.

In some embodiments, the first quench medium stream can be fed through the quench medium inlet into the pyrolysis zone and the pyrolysis zone effluent can be contacted with the second quench medium. In other embodiments, the first quench medium stream can be fed through the quench medium inlet into the pyrolysis zone and the first gaseous stream can be contacted with the third quench medium. In other embodiments, the first quench medium stream can be fed through the quench medium inlet into the pyrolysis zone, the pyrolysis zone effluent can be contacted with the second quench medium, and the first gaseous stream can be contacted with the third quench medium. In other embodiments, the pyrolysis zone effluent can be contacted with the second quench medium and the first gaseous stream can be contacted with the third quench medium.

The one or more reactive hydrocarbons in the first quench medium, the second quench medium, and the third quench medium can independently include one or more alkanes. Pyrolysis of at least a portion of the reactive hydrocarbons can produce additional one or more olefins. In some embodiments, the one or more alkanes can include ethane, propane, butane, or a mixture thereof.

The second particle stream rich in the particles can be further processed in the same or similar manner as described above with regard to the first aspect of this disclosure. More particularly, at least a portion of the second particle stream, the oxidant stream, the optional steam stream, the optional fuel stream, and/or the optional diluent stream can be fed into a gasification/combustion zone. The second particle stream, the oxidant stream, and the optional steam stream and/or the optional fuel stream can be contacted within the gasification/combustion zone to effect gasification/combustion of at least a portion of the coke disposed on the surface of the particle to produce a gasification/combustion zone effluent that can include heated and regenerated particles and a gasification/combustion gas mixture. In some embodiments the gasification/combustion zone can be configured to produce primarily a gasification/combustion gas mixture that can include a synthesis gas that can include molecular hydrogen, carbon monoxide, and carbon dioxide. In other embodiments, the gasification/combustion zone can be configured to produce primarily a gasification/combustion gas mixture that can include a flue gas that can include nitrogen, carbon dioxide, and water.

A second gaseous stream rich in the gasification/combustion gas mixture and a third particle stream rich in the heated and regenerated particles can be obtained from the gasification/combustion zone effluent. At least a portion of the third particle stream can be fed into the pyrolysis zone as at least a portion of the first particle stream. The second gaseous stream can be further processed to produce the cooled second gaseous stream, the purified second gaseous stream, and the compressed second gaseous stream. In some embodiments, a portion of the compressed second gaseous stream can be introduced into the gasification/combustion zone as the optional diluent.

Figure 4:
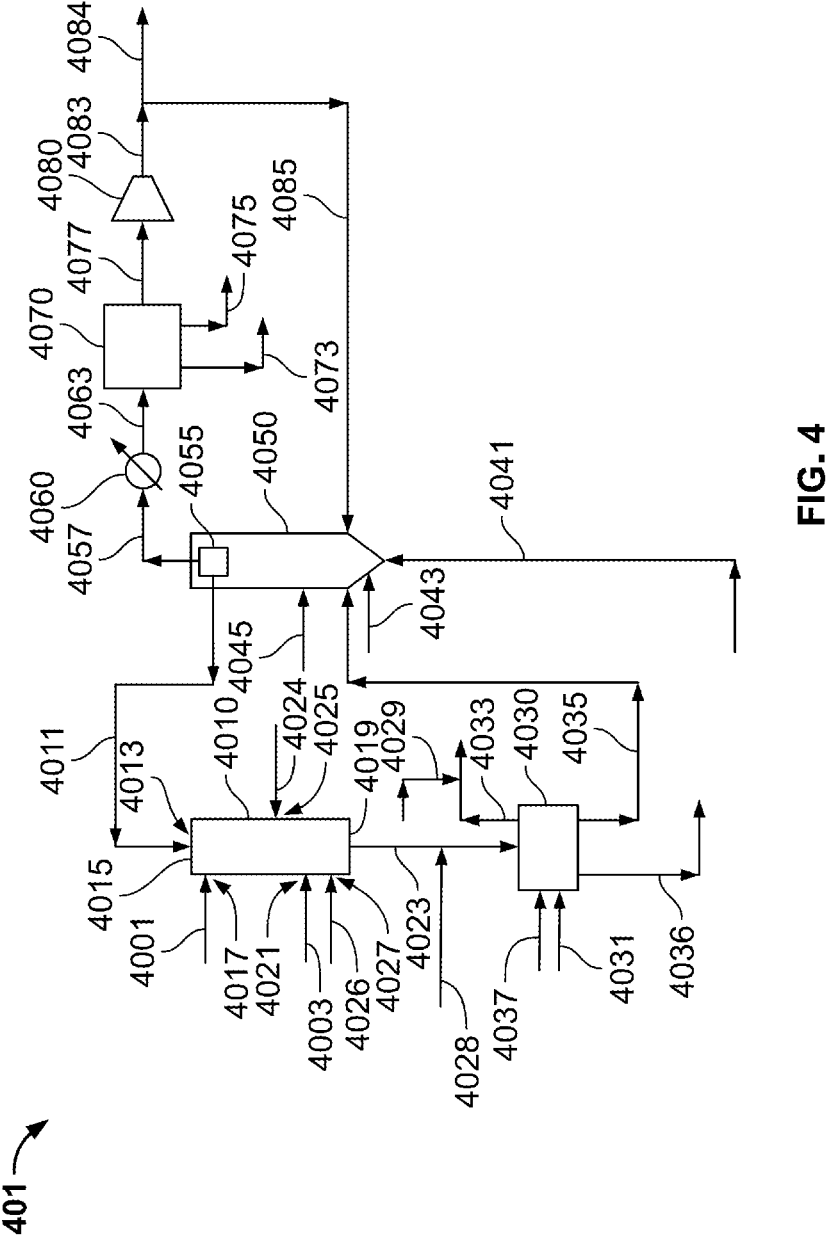
FIG. 4 depicts an illustrative system for converting a hydrocarbon-containing feed within a pyrolysis zone and cooling the product produced therein, according to one or more embodiments described.

FIG. 4 depicts an illustrative system 401 for converting a hydrocarbon-containing feed in line 4001 within a pyrolysis zone 4010 and cooling the product produced therein, according to one or more embodiments. The system 401 can include one or more pyrolysis zones 4010, one or more separation stages or first separation stages 4030, one or more gasification/combustion zones 4050, and one or more second separation stages 4055. The system 401 can also include one or more heat exchange stages 4060, one or more third separation stages 4070, and one or more compression staged 4080. The hydrocarbon-containing feed via line 4001 can be fed into the pyrolysis zone 4010 through a hydrocarbon feed inlet 4017. A first particle stream via line 4011 that can include particles at a pyrolysis temperature can be fed into the pyrolysis zone 4010 through a first particles inlet 4013. The first particles inlet 4013 can be in proximity to or connected to a first end 4015 of the pyrolysis zone 4010. The hydrocarbon-containing feed in line 4001 can include one or more hydrocarbons and optionally steam. In some embodiments, an optional steam stream via line 4024 can be fed through a steam inlet 4025 into the pyrolysis zone 4010. In some embodiments, the steam inlet 4025 can be upstream of the second pyrolysis feed inlet 4027. The hydrocarbon-containing feed and the particles can be contacted in the pyrolysis zone 4010 to effect pyrolysis of at least a portion of the hydrocarbons in the hydrocarbon-containing feed to produce a pyrolysis zone effluent. The pyrolysis zone effluent can include olefins and the particles. Coke can be formed on the surface of the particles. The pyrolysis zone effluent can be recovered or otherwise obtained via line 4023 from the pyrolysis zone 4010.

In some embodiments, the hydrocarbon-containing feed in line 4001 can include hydrocarbons in vapor phase immediately before entering the pyrolysis zone 4010 and optionally steam. In other embodiments, the hydrocarbon-containing feed in line 4001 can include or preferably consist essentially of hydrocarbons in liquid phase immediately before entering the pyrolysis zone 4010 and optionally steam. In other embodiments, the hydrocarbon-containing feed in line 4001 can be a first hydrocarbon-containing feed that can be fed into the pyrolysis zone 4010 through the hydrocarbon feed inlet 4017 that can also be referred to as a first hydrocarbon feed inlet 4017 and a second hydrocarbon-containing feed via line 4003 can be fed into the pyrolysis zone 4010 through a second hydrocarbon feed inlet 4021. In some embodiments, the first hydrocarbon-containing feed in line 4001 can include the hydrocarbons in vapor phase immediately before entering the pyrolysis zone 4010 and the second hydrocarbon-containing feed in line 4003 can include the hydrocarbons in liquid phase immediately before entering the pyrolysis zone 4010. In some embodiments, the first hydrocarbon-containing feed in line 4001 and the second hydrocarbon-containing feed in line 4003 can be produced by heating a $C_{5+}$ hydrocarbon-containing feed that can include water to produce a heated feed, and the first and second hydrocarbon-containing feeds can be obtained from the heated feed.

In some embodiments, the hydrocarbon feed inlet or first hydrocarbon feed inlet 4017 can be located closer to the first end 4015 of the pyrolysis zone 4010 than a second end 4019 of the pyrolysis zone 4010. In some embodiments, the second hydrocarbon feed inlet 4021 can be located closer to the second end 4019 of the pyrolysis zone 4010. In some embodiments, when the first and second hydrocarbon feed inlets 4017, 4021 and the optional steam inlet 4025 are present, the steam inlet 4025 can be located between the first and second hydrocarbon feed inlets 4017, 4021.

In some embodiments, a first quench medium that can include one or more reactive hydrocarbons via line 4026 can be fed into the pyrolysis zone 4010 through a quench medium inlet 4027. The quench medium inlet 4027 can be located downstream of the first pyrolysis feed inlet 4017, or if present, downstream of the second pyrolysis feed inlet

4021 and upstream of the second end 4019 of the pyrolysis zone 4010. The second pyrolysis zone effluent can be at a temperature sufficient to effect pyrolysis of at least a portion of the one or more reactive hydrocarbons in the first quench medium. The pyrolysis of at least a portion of the one or more reactive hydrocarbons in the first quench medium can produce a cooled or first cooled pyrolysis effluent that can be obtained via line 4023 from the pyrolysis zone 4010. The cooled or first cooled pyrolysis effluent via line 4023 can be fed into the first separation stage 4030.

In other embodiments, a second quench medium that can include one or more reactive hydrocarbons via line 4028 can be contacted with the pyrolysis zone effluent or the first cooled pyrolysis zone effluent in line 4023 after exiting the pyrolysis zone 4010 and before being fed into the separation stage 4030. The second pyrolysis zone effluent in line 4023 can be at a temperature sufficient to effect pyrolysis of at least a portion of the one or more reactive hydrocarbons in the second quench medium. The pyrolysis of at least a portion of the one or more reactive hydrocarbons in the first quench medium can produce a cooled or second cooled pyrolysis effluent that can be fed into the first separation stage 4030. As such, in some embodiments, when both the first and second quench mediums in lines 4026 and 4028 are used, a first cooled pyrolysis effluent can be obtained from the pyrolysis zone 4010 and a second cooled pyrolysis effluent can be introduced via line 4023 into the first separation stage 4030.

Optionally a stripping steam stream via line 4031 can be introduced into the first separation stage 4030 to improve the separation of gaseous components that can be entrained in the particles. A first gaseous stream rich in the olefins via line 34033 and a second particle stream rich in the particles via line 4035 can be obtained from the first separation stage 4030. In some embodiments, a portion of the particles from the pyrolysis zone effluent, the cooled pyrolysis zone effluent, or the second cooled pyrolysis zone effluent can be recovered via line 4036 from the first separation stage 4030 and removed from the system 301. In some embodiments, it can be desirable to remove some of the particles via line 4036 and replace the removed particles with fresh or make-up particles via line 4037. For example, should the particles accumulate too much of a transition metal on the surface thereof some of the particles can be removed via line 4036 while make-up particles can be introduced via line 4037 into the system 401.

In some embodiments, the first gaseous stream rich in the hydrocarbons in line 4033 can be contacted with a third quench medium that can include one or more reactive hydrocarbons in line 4029. The first gaseous stream in line 4033 can be at a temperature sufficient to effect pyrolysis of at least a portion of the one or more reactive hydrocarbons in the third quench medium. In some embodiments, the pyrolysis zone effluent in line 4023 and/or the first gaseous stream in line 3033 can independently be at a temperature of 800° C., 850° C., or 900° C., to 1,000° C., 1,050° C., or 1,100° C. The first, second, and third quench mediums in lines 4026, 4028, and 4029, respectively, can independently be or include, but are not limited to, ethane, propane, butane, and any mixture thereof.

The second particle stream via line 4035, an oxidant stream via line 4041, an optional steam stream via line 4043, an optional fuel stream via line 4045, and/or an optional diluent stream via line 4085 can be introduced or otherwise fed into the gasification/combustion zone 4050. The particles having the coke formed on the surface thereof, the oxidant, the optional steam stream, the optional fuel stream, and/or the optional diluent stream can be contacted within the gasification/combustion zone 4050 to effect gasification and/or combustion of at least a portion of the coke disposed on the surface of the particles to produce a gasification/combustion zone effluent. The gasification/combustion zone effluent can include heated and regenerated particles and a gasification/combustion gas mixture. In some embodiments, the gasification/combustion gas mixture can include molecular hydrogen, carbon monoxide, and carbon dioxide. In other embodiments, the gasification/combustion gas mixture can include a flue gas that can include nitrogen, carbon dioxide, and water.

In some embodiments, the gasification/combustion zone effluent can be fed into the third separation stage 4055 and a third particle stream that can include the heated and regenerated particles via line 4011 and a second gaseous stream rich in the gasification/combustion gas mixture via line 4057 can be recovered or otherwise obtained therefrom. The third separation stage 4055, as shown, can be disposed within the gasification/combustion zone 4050. However, the third separation stage 4055 can also be located outside the gasification/combustion zone 4050. The third separation stage 4055 can be an inertial separator or other separator as described above. In some embodiments, at least a portion of the third particle stream via line 4011 can be fed into the pyrolysis zone 4010 as at least a portion of the first particle stream introduced thereto.

In some embodiments, the second gaseous stream via line 4057 can be fed into the heat exchange stage 4060 to produce a cooled or quenched second gaseous stream via line 4063. The cooled second gaseous stream in line 4063 can be rich in the gasification/combustion zone mixture and can include condensed or liquid water. The second gaseous stream in line 4063 can be indirectly cooled by transferring heat from the second gaseous stream to a cooling medium, by direct contact with a cooling medium, or a combination thereof. In some embodiments, at least a portion of any particles entrained in the second gaseous stream in line 4057 can also be present in the condensed water. The cooled second gaseous stream via line 4063 can be introduced or otherwise fed into the third separation stage 4070 to separate at least a portion of the condensed water and, if present, particles via line 4073.

In some embodiments, the third separation stage 4070 can include multiple separation stages. In some embodiments, the third separation stage 4070, in addition to removing the water and, if present, particles, can also include a hydrogen sulfide removal stage. As such, hydrogen sulfide, if present, can also be removed via line 4075 from the cooled second gaseous stream in the third separation stage 4070. A purified second gaseous steam via line 4077 can be recovered or otherwise obtained from the third separation stage 4070.

In some embodiments, the purified second gaseous stream via line 4077 can be introduced or otherwise fed into the compression stage 4080 to produce a compressed second gaseous stream via line 4083. In some embodiments, all or a portion of the compressed second gaseous stream in line 4083 can be removed from the system 401 via line 4084. In some embodiments, a first portion of the compressed second gaseous stream in line 4083 can be introduced or otherwise fed via line 4085 to the gasification/combustion zone 4050 as the optional diluent stream and a second portion via line 4084 can be removed from the system 401.

Listing of Embodiments

This disclosure may further include the following non-limiting embodiments.

A1. A process for converting a hydrocarbon-containing feed by pyrolysis and gasification/combustion, comprising: (I) heating a hydrocarbon-containing feed comprising $C_{5+}$ hydrocarbons and water to produce a heated feed; (II) separating a vapor fraction and a liquid fraction from the heated feed, wherein the vapor fraction comprises steam; (III) feeding at least one of (a) a portion of the vapor fraction through a first pyrolysis feed inlet and (b) a portion of the liquid fraction through a second pyrolysis feed inlet, and a first particle stream comprising particles having a pyrolysis temperature through a first particles inlet into a first pyrolysis zone; (IV) optionally feeding a first steam stream through a first steam stream inlet into the first pyrolysis zone; (V) contacting the vapor fraction and/or the liquid fraction with the particles in the first pyrolysis zone under a first set of pyrolysis conditions to effect pyrolysis of at least a portion of the hydrocarbons in the vapor fraction and/or the liquid fraction; (VI) obtaining from the first pyrolysis zone a first pyrolysis zone effluent comprising olefins and the particles, wherein coke is formed on the surface of the particles; (VII) obtaining from the first pyrolysis zone effluent a first gaseous stream rich in the olefins and a second particle stream rich in the particles; (VIII) feeding at least a portion of the second particle stream, an oxidant stream, and optionally a second steam stream into a gasification/combustion zone; (IX) contacting the second particle stream, the oxidant stream, and the optional second steam stream within the gasification/combustion zone to effect gasification and/or combustion of at least a portion of the coke disposed on the surface of the particles to produce a gasification/combustion zone effluent comprising regenerated particles and a gasification/combustion gas mixture; (X) obtaining from the gasification/combustion zone effluent a second gaseous stream rich in the gasification/combustion gas mixture and a third particle stream rich in the regenerated particles; and (XI) feeding at least a portion of the third particle stream into the first pyrolysis zone as at least a portion of the particles fed into the first pyrolysis zone in step (III).

A2. The process of A1, wherein: the first pyrolysis zone has a first end and a second end, the first particles inlet is in proximity to or connected to the first end of the first pyrolysis zone; the first pyrolysis zone effluent exits the first pyrolysis zone from the second end; and the first pyrolysis feed inlet, if present, is located downstream of the first particles inlet and upstream of the second end; the second pyrolysis feed inlet, if present, is located downstream of the first particles inlet and upstream of the second end; and the first steam stream inlet, if present, is located downstream of the first particles inlet and upstream of the second end.

A3. The process of A2, wherein both the first pyrolysis feed inlet and the second pyrolysis feed inlet are present, and the second pyrolysis feed inlet is downstream of the first pyrolysis feed inlet.

A4. The process of A2 or A3, wherein both the first pyrolysis feed inlet and the second pyrolysis feed inlet are present at substantially the same distance from the first end, the first pyrolysis zone has a longitudinal axis, and the second pyrolysis feed inlet distributes the liquid fraction at a location closer to the longitudinal axis than the first pyrolysis feed inlet distributes the vapor fraction.

A5. The process of any of A1 to A4, wherein the first steam stream inlet and the second pyrolysis feed inlet are both present, and the first steam stream inlet is located upstream of the second pyrolysis feed inlet.

A6. The process of any of A1 to A5, wherein the first pyrolysis zone comprises a vessel wall, and the first steam feed inlet distributes steam at a location closer to the vessel wall than the second pyrolysis feed inlet distributes the liquid fraction.

A7. The process of any of A1 to A6, wherein a third steam stream is injected into the liquid fraction to obtain a liquid fraction/steam mixture, and the liquid fraction/steam mixture is then fed into the first pyrolysis zone through the second pyrolysis feed inlet.

A8. The process of any of A2 to A7, wherein the second pyrolysis feed inlet and the first steam stream inlet are located adjacent the second end of the first pyrolysis zone.

A9. The process of A8, wherein the first pyrolysis feed inlet is located adjacent the first end of the first pyrolysis zone.

A10. The process of any of A1 to A9, wherein step (VIII) further comprises feeding a diluent stream into the gasification/combustion zone, and wherein the diluent stream comprises a portion of the second gaseous stream obtained in step (X).

A11. The process of any of A1 to A10, wherein the following is met: (i) the hydrocarbon-containing feed is heated to a temperature of 325° C. to 450° C. in step (I).

A12. The process of any of A1 to A11, wherein the following is met: (ii) a weight ratio of steam to the hydrocarbons in the vapor fraction fed into the first pyrolysis zone is from 0.05 to 2.

A13. The process of any of A1 to A12, wherein the following is met: (iii) a weight ratio of the first steam stream to the hydrocarbons in the liquid fraction fed into the first pyrolysis zone is from 0.2 to 2.

A14. The process of any of A1 to A13, wherein the following is met: (iv) the first pyrolysis zone is operated at a temperature of 800° C. to 1,100° C.

A15. The process of any of A1 to A14, wherein the following is met: (v) a pressure within the first pyrolysis zone is from 100 kPa-absolute to 7,000 kPa-absolute.

A16. The process of any of A1 to A15, wherein the following is met: (vi) a velocity of the gaseous components within the first pyrolysis zone is in a range of 9 m/s to 155 m/s.

A17. The process of any of A1 to A16, wherein the following is met: (vii) a velocity of the particles within the first pyrolysis zone is up to 15.5 m/s.

A18. The process of any of A1 to A17, wherein the following is met: (viii) a velocity of gaseous components within the first pyrolysis zone is at least 20% greater than a velocity of the particles within the first pyrolysis zone.

A19. The process of any of A1 to A18, wherein the following is met: (ix) a weight ratio of the particles to a combined amount of the vapor fraction and the liquid fraction fed into the first pyrolysis zone is from 10 to 50.

A20. The process of any of A1 to A19, wherein the following is met: (x) the vapor fraction and/or the liquid fraction are contacted with the particles within the first pyrolysis zone for a residence time of 10 milliseconds to 700 milliseconds.

A21. The process of any of A1 to A20, wherein the following is met: (xi) the first pyrolysis zone effluent is at a temperature of 900° C. to 1,050° C. when obtained from the first pyrolysis zone.

A22. The process of any of A1 to A21, further comprising: (XII) indirectly transferring heat from the second gaseous stream to a cooling medium to produce a cooled second gaseous stream comprising water; (XIII) separating at least a portion of the water from the cooled second gaseous stream and, if present, optionally separating, at least one of: (i) at least a portion of any regenerated particles and (ii) at least a portion of hydrogen sulfide from the cooled second gaseous stream to produce a purified second gaseous stream; and (XIV) compressing at least a portion of the purified second gaseous stream to produce a compressed second gaseous stream.

A23. The process of A22, wherein a portion of the compressed second gaseous stream is fed into the gasification/combustion zone in step (VIII) as a diluent stream.

A24. The process of any of A1 to A23, wherein the particles fed into the first pyrolysis zone in step (III) comprise an oxide of a transition metal element capable of oxidizing molecular hydrogen within the first pyrolysis zone, and wherein at least a portion of the transition metal element in the particles in the third particle stream rich in the particles is at a reduced state compared to the transition metal element in the particles fed into the first pyrolysis zone.

A25. The process of A24, wherein the oxide of the transition metal element favors the oxidation of hydrogen over the oxidation of hydrocarbons in the first pyrolysis zone.

A26. The process of any of A1 to A25, wherein the gasification/combustion zone is operated at a temperature of at least 1,000° C. such as 1,200° C. to 1,500° C. and at a pressure of <800 kPa-absolute.

A27. The process of any of A1 to A26, wherein the gasification/combustion zone is operated at a temperature of at least 1,000° C. such as 1,200° C. to 1,500° C. and at a pressure of ≥800 kPa-absolute such as 800 kPa-absolute to 7,000 kPa-absolute.

A28. The process of any of A1 to A27, wherein the gasification/combustion gas mixture comprises molecular hydrogen, carbon monoxide, and carbon dioxide or a flue gas comprising nitrogen, $CO_2$, and water.

A29. The process of any of A1 to A28, wherein in step (III), at least a portion of the vapor fraction is fed into the first pyrolysis zone, and the process further comprises: (XV) feeding at least a portion of the liquid fraction through a third pyrolysis feed inlet and a fourth particle stream comprising particles having a pyrolysis temperature through a second particles inlet into a second pyrolysis zone; (XVI) optionally feeding a fourth steam stream through a fourth steam stream inlet into the second pyrolysis zone; (XVII) contacting the liquid fraction with the particles in the second pyrolysis zone under a second set of pyrolysis conditions to effect pyrolysis of at least a portion of the hydrocarbons in the liquid fraction; (XVIII) obtaining from the second pyrolysis zone a second pyrolysis zone effluent comprising olefins and the particles, wherein coke is formed on the surface of the particles; and (XIX) obtaining from the second pyrolysis zone effluent a third gaseous stream rich in the olefins and a fifth particle stream rich in the particles; (XX) feeding at least a portion of the fifth particle stream, along with the first particle stream, the oxidant stream, and the optional second steam stream into the gasification/combustion zone; and (XXI) contacting the particle streams, the oxidant stream, and the optional second steam stream within the gasification/combustion zone to effect gasification/combustion of at least a portion of the coke disposed on the surface of the particles to produce the gasification/combustion zone effluent comprising the regenerated particles and the gasification/combustion gas mixture; (XXII) obtaining from the gasification/combustion zone effluent the second gaseous stream rich in the gasification/combustion gas mixture and the third particle stream rich in the regenerated particles; and (XXIII) feeding at least a portion of the third particle stream into the second pyrolysis zone as at least a portion of the fourth particle stream fed into the second pyrolysis zone in step (XV).

A30. The process of A29, wherein any portion of the liquid fraction is not fed into the first pyrolysis zone, and any portion of the vapor fraction is not fed into the second pyrolysis zone.

A31. The process of A29 or A30, wherein step (XVI) is carried out, and the fourth steam stream inlet is downstream of the second particles inlet.

A32. The process of any of A29 to A31, wherein at least one of the following is met: (i) a weight ratio of steam to the liquid fraction fed into the second pyrolysis zone is 0.01:1 to 6:1; the second pyrolysis zone is operated at a temperature of 800° C. to 1,100° C.; a pressure within the second pyrolysis zone is from 100 kPa-absolute to 7,000 kPa-absolute; a velocity of the vaporized liquid components within the second pyrolysis zone is in a range of 9 m/s to 155 m/s; a velocity of the second heated particles within the second pyrolysis zone is up to 15.5 m/s; a velocity of vaporized liquid phase components within the second pyrolysis zone is at least 20% greater than a velocity of the particles within the second pyrolysis zone; a weight ratio of the fourth heated particles to the hydrocarbons in the liquid fraction fed into the second pyrolysis zone is 10 to 50; the liquid fraction is contacted with the second heated particles within the second pyrolysis zone for a residence time of 10 milliseconds to 700 milliseconds; and the second pyrolysis zone effluent is at a temperature of 900° C. to 1,050° C. when obtained from the second pyrolysis zone.

B1. A process for converting a hydrocarbon-containing feed by pyrolysis and gasification/combustion, the process comprising: (I) feeding a first particle stream comprising particles at a pyrolysis temperature into a pyrolysis zone through a particles inlet in proximity to or connected to a first end of the pyrolysis zone; (II) feeding a vapor phase hydrocarbon-containing feed comprising hydrocarbons and steam into the pyrolysis zone through a first pyrolysis feed inlet, wherein the first pyrolysis feed inlet is located closer to the first end than a second end of the pyrolysis zone; (III) contacting the vapor phase hydrocarbon-containing feed with the particles in the pyrolysis zone to effect pyrolysis of at least a portion of the hydrocarbons in the vapor phase hydrocarbon-containing feed to produce a first pyrolysis zone effluent comprising olefins and the particles, wherein coke is formed on the surface of the particles; (IV) feeding a liquid phase hydrocarbon-containing feed into the pyrolysis zone through a second pyrolysis feed inlet, wherein the second pyrolysis feed inlet is located closer to the second end than the first end of the pyrolysis zone, and the second pyrolysis feed inlet is downstream of the first pyrolysis feed inlet; (V) contacting the liquid phase hydrocarbon-containing feed with the particles in the pyrolysis zone to effect pyrolysis of at least a portion of the liquid phase hydrocarbon-containing feed to produce a second pyrolysis zone effluent comprising additional olefins and the particles, wherein additional coke is formed on the surface of the particles; (VI) obtaining from the second pyrolysis zone effluent a first gaseous stream rich in the olefins and a second particle stream rich in the particles; (VII) feeding at least a portion of the second particle stream, an oxidant stream, and an optional steam stream into a gasification/combustion zone; (VIII) contacting the second particle stream, the oxidant stream, and the optional steam stream within the gasification/combustion zone to effect gasification/combustion of at least a portion of the coke disposed on the surface of the particles to produce a gasification/combustion zone effluent comprising heated and regenerated particles and a gasification/combustion gas mixture; (IX) obtaining from the gasification/combustion zone effluent a second gaseous stream rich in gasification/combustion gas mixture and a third particle stream rich in the heated and regenerated particles; and (X) feeding at least a portion of the third particle stream into the pyrolysis zone as at least a portion of the particles fed into the pyrolysis zone in step (I).

B2. The process of B1, wherein the particles in the first pyrolysis zone effluent comprise 0.01 wt % to 5 wt % of coke based on a total weight of the particles.

B3. The process of B1 or B2, wherein the particles in the second particle stream comprise 0.1 wt % to 10 wt % of coke based on a total weight of the particles.

B4. The process of any of B1 to B3, wherein the second gaseous stream comprises, on a volume basis, ≥5% of a combined amount of carbon monoxide and carbon dioxide.

B5. The process of any of B1 to B4, wherein the vapor phase hydrocarbon-containing feed and the liquid phase hydrocarbon-containing feed are produced by heating a $C_{5+}$ hydrocarbon-containing feed that comprises water to produce a heated feed; and obtaining from the heated feed the vapor phase hydrocarbon-containing feed and the liquid phase hydrocarbon-containing feed.

B6. The process of any of B1 to B5, further comprising feeding a steam stream into the pyrolysis zone through a first steam stream inlet located downstream of the first pyrolysis feed inlet and upstream of the second pyrolysis feed inlet.

B7. The process of any of B1 to B6, wherein the following is met: (i) a weight ratio of the steam to the hydrocarbons in the vapor phase hydrocarbon-containing feed fed into the pyrolysis zone is 0.05 to 2.

B8. The process of any of B1 to B7, wherein the following is met: (ii) a weight ratio of the steam stream to the liquid phase hydrocarbon-containing feed fed into the pyrolysis zone is 0.2 to 2.

B9. The process of any of B1 to B8, wherein the following is met: (iii) the pyrolysis zone is operated at a temperature of 800° C. to 1,100° C.

B10. The process of any of B1 to B9, wherein the following is met: (iv) a pressure within the pyrolysis zone is from 100 kPa-absolute to 7,000 kPa-absolute.

B11. The process of any of B1 to B10, wherein the following is met: (v) a velocity of the gaseous components within the pyrolysis zone is in a range of 9 m/s to 155 m/s.

B12. The process of any of B1 to B11, wherein the following is met: (vi) a velocity of the particles within the pyrolysis zone is up to 15.5 m/s.

B13. The process of any of B1 to B12, wherein the following is met: (vii) a velocity of gaseous components within the pyrolysis zone is at least 20% greater than a velocity of the particles within the pyrolysis zone.

B14. The process of any of B1 to B13, wherein the following is met: (viii) a weight ratio of the particles to a combined amount of the vapor phase hydrocarbon-containing feed and the liquid phase hydrocarbon-containing feed fed into the pyrolysis zone is 10 to 50.

B15. The process of any of B1 to B14, wherein the following is met: (ix) the vapor phase hydrocarbon-containing feed and the liquid phase hydrocarbon-containing feed are contacted with the particles within the pyrolysis zone for a residence time of 10 milliseconds to 700 milliseconds.

B16. The process of any of B1 to B15, wherein the following is met: (x) the second pyrolysis zone effluent is at a temperature of 900° C. to 1,050° C. upon exiting the pyrolysis zone.

B17. The process of any of B1 to B16, further comprising feeding a first quench medium comprising one or more reactive hydrocarbons into the pyrolysis zone through a quench medium inlet, wherein the quench medium inlet is located downstream of the second pyrolysis feed inlet and upstream of the second end of the pyrolysis zone, and wherein the second pyrolysis zone effluent is at a temperature sufficient to effect pyrolysis of at least a portion of the one or more reactive hydrocarbons in the first quench medium.

B18. The process of any of B1 to B17, further comprising contacting the first gaseous stream with a second quench medium comprising one or more reactive hydrocarbons, and wherein the first gaseous steam is at a temperature sufficient to effect pyrolysis of at least a portion of the one or more reactive hydrocarbons in the second quench medium.

B19. The process of B17 or B18, wherein the first quench medium and the second quench medium independently comprise at least one of ethane, propane, butane.

B20. The process of any of B1 to B19, wherein the gasification/combustion gas mixture comprises molecular hydrogen, carbon monoxide, and carbon dioxide or a flue gas comprising nitrogen, $CO_2$, and water.

C1. A process for converting a hydrocarbon-containing feed by pyrolysis and gasification/combustion, the process comprising: (I) feeding the hydrocarbon-containing feed and heated particles through a hydrocarbon feed inlet and heated particles through a first particle inlet into a pyrolysis zone; (II) contacting the hydrocarbon-containing feed with the heated particles in the pyrolysis zone to effect pyrolysis of at least a portion of the hydrocarbon-containing feed to produce a pyrolysis zone effluent comprising olefins and the particles, wherein coke is formed on the surface of the particles; (III) carrying at least one of (IIIa), (IIIb), and (IIIc) below: (IIIa) carrying out (IIIa-1) and (IIIa-2) below: (IIIa-1) feeding a first quench medium stream comprising one or more reactive hydrocarbons through a first quench medium inlet into the pyrolysis zone, wherein the first quench medium inlet is downstream of the hydrocarbon feed inlet, wherein at least a portion of the one or more reactive hydrocarbons undergoes pyrolysis, and wherein a cooled pyrolysis zone effluent is obtained from the pyrolysis zone; (IIIa-2) obtaining from the cooled pyrolysis zone effluent a first gaseous stream rich in the olefins and a second particle stream rich in the particles; (IIIb) carrying out (IIIb-1) and (IIIb-2) below: (IIIb-1) contacting the pyrolysis zone effluent with a second quench medium comprising one or more reactive hydrocarbons to produce a cooled pyrolysis zone effluent, wherein the pyrolysis zone effluent is at a temperature sufficient to effect pyrolysis of at least a portion of the one or more reactive hydrocarbons in the second quench medium; and (IIIb-2) obtaining from the cooled pyrolysis zone effluent a first gaseous stream rich in the olefins and a second particle stream rich in the particles; (IIIc) carrying out (IIIc-1) and (IIIc-2) below: (IIIc-1) obtaining from the pyrolysis zone effluent a first gaseous stream rich in the olefins and a second particle stream rich in the particles; and (IIIc-2) contacting the first gaseous stream with a third quench medium comprising one or more reactive hydrocarbons to produce a cooled first gaseous stream, wherein the first gaseous stream is at a temperature sufficient to effect pyrolysis of at least a portion of the one or more reactive hydrocarbons in the third quench medium; (IV) feeding at least a portion of the second particle stream, an oxidant stream, and an optional second steam stream into a gasification/combustion zone; (V) contacting the second particle stream, the oxidant stream, and the optional steam stream within the gasification/combustion zone to effect gasification/combustion of at least a portion of the coke disposed on the surface of the particles to produce a gasification/combustion zone effluent comprising heated and regenerated particles and a gasification/combustion gas mixture; (VI) obtaining from the gasification/combustion zone effluent a second gaseous stream rich in the gasification/combustion gas mixture and a third particle stream rich in the heated and regenerated particles; and (VII) feeding at least a portion of the third particle stream into the pyrolysis zone as at least a portion of the heated particles fed into the pyrolysis zone in step (I).

C2. The process of C1, wherein the hydrocarbon-containing feed comprises hydrocarbons in vapor phase immediately before entering the pyrolysis zone and optionally steam.

C3. The process of C1 or C2, wherein the hydrocarbon-containing feed comprises or preferably consists essentially of hydrocarbons in liquid phase immediately before entering the pyrolysis zone and optionally steam.

C4. The process of C1, wherein step (I) comprises: (Ia) feeding a first hydrocarbon-containing feed comprising hydrocarbons in vapor phase immediately before entering the pyrolysis zone and optionally steam into the pyrolysis zone through a first pyrolysis feed inlet; and (Ib) feeding a second hydrocarbon-containing feed comprising hydrocarbons in liquid phase immediately before entering the pyrolysis zone and optionally steam into the pyrolysis zone through a second pyrolysis feed inlet.

C5. The process of C4, wherein the first hydrocarbon-containing feed and the second hydrocarbon-containing feed are produced by heating a $C_{5+}$ hydrocarbon-containing feed that comprises water to produce a heated feed; and obtaining from the heated feed the first hydrocarbon-containing feed and the second hydrocarbon-containing feed.

C6. The process of any of C1 to C5, further comprising feeding a steam stream through a steam inlet into the pyrolysis zone in step (I).

C7. The process of C6, wherein the steam inlet is upstream of the second pyrolysis feed inlet.

C8. The process of any of C1 to C7, wherein the one or more reactive hydrocarbons comprise one or more alkanes, and wherein at least a portion of the one or more alkanes is converted to one or more olefins.

C9. The process of C8, wherein the one or more alkanes comprises ethane, propane, butane, or a mixture thereof.

C10. The process of any of C1 to C9, wherein at least one of step (IIIa) and step (IIIb) is carried out, and the following is met: (i) the hydrocarbon-containing feed comprises steam.

C11. The process of any of C1 to C10, wherein at least one of step (IIIa) and step (IIIb) is carried out, and the following is met: (ii) a weight ratio of the steam to hydrocarbons in the hydrocarbon-containing feed fed into the pyrolysis zone is 0.05 to 6.

C12. The process of any of C1 to C11, wherein at least one of step (IIIa) and step (IIIb) is carried out, and the following is met: (iii) the pyrolysis zone is operated at a temperature of 800° C. to 1,100° C.

C13. The process of any of C1 to C12, wherein at least one of step (IIIa) and step (IIIb) is carried out, and the following is met: (iv) a pressure within the pyrolysis zone is from 100 kPa-absolute to 7,000 kPa-absolute.

C14. The process of any of C1 to C13, wherein at least one of step (IIIa) and step (IIIb) is carried out, and the following is met: (v) a velocity of the gaseous components within the pyrolysis zone is in a range of 9 m/s to 155 m/s.

C15. The process of any of C1 to C14, wherein at least one of step (IIIa) and step (IIIb) is carried out, and the following is met: (vi) a velocity of the particles within the pyrolysis zone is up to 15.5 m/s.

C16. The process of any of C1 to C15, wherein at least one of step (IIIa) and step (IIIb) is carried out, and the following is met: (vii) a velocity of gaseous components within the pyrolysis zone is at least 20% greater than a velocity of the particles within the pyrolysis zone.

C17. The process of any of C1 to C16, wherein at least one of step (IIIa) and step (IIIb) is carried out, and the following is met: (viii) a weight ratio of the particles to the hydrocarbons in the hydrocarbon-containing feed fed into the pyrolysis zone is 10 to 50.

C18. The process of any of C1 to C17, wherein at least one of step (IIIa) and step (IIIb) is carried out, and the following is met: (ix) the hydrocarbon-containing feed is contacted with the heated particles within the pyrolysis zone for a residence time of 10 milliseconds to 700 milliseconds.

C19. The process of any of C1 to C18, wherein at least one of step (IIIa) and step (IIIb) is carried out, and the following is met: (x) the pyrolysis zone effluent is at a temperature of 900° C. to 1,050° C. when contacted with the quench medium.

C20. The process of any of C1 to C19, wherein at least one of step (IIIa) and step (IIIb) is carried out, and the following is met: (xi) the cooled first gaseous stream is at a temperature of 650° C. to 850° C.

C21. The process of any of C1 to C20, wherein step (IIIc) is carried out, and the following is met: (i) the hydrocarbon-containing feed comprises steam C22. The process of any of C1 to C21, wherein step (IIIc) is carried out, and the following is met: (ii) a weight ratio of the steam to hydrocarbons in the hydrocarbon-containing feed fed into the pyrolysis zone is 0.05 to 6.

C23. The process of any of C1 to C22, wherein step (IIIc) is carried out, and the following is met: (iii) the pyrolysis zone is operated at a temperature of 800° C. to 1,100° C.

C24. The process of any of C1 to C23, wherein step (IIIc) is carried out, and the following is met: (iv) a pressure within the pyrolysis zone is from 100 kPa-absolute to 7,000 kPa-absolute.

C25. The process of any of C1 to C24, wherein step (IIIc) is carried out, and the following is met: (v) a velocity of the gaseous components within the pyrolysis zone is in a range of 9 m/s to 155 m/s, (vi) a velocity of the particles within the pyrolysis zone is up to 15.5 m/s.

C26. The process of any of C1 to C25, wherein step (IIIc) is carried out, and the following is met: (vii) a velocity of gaseous components within the pyrolysis zone is at least 20% greater than a velocity of the particles within the pyrolysis zone.

C27. The process of any of C1 to C26, wherein step (IIIc) is carried out, and the following is met: (viii) a weight ratio of the particles to a hydrocarbons in the hydrocarbon-containing feed fed into the pyrolysis zone is 10 to 50.

C28. The process of any of C1 to C27, wherein step (IIIc) is carried out, and the following is met: (ix) the hydrocarbon-containing feed and the quench medium are contacted with the particles within the pyrolysis zone for a residence time of 10 milliseconds to 700 milliseconds.

C29. The process of any of C1 to C28, wherein step (IIIc) is carried out, and the following is met: (x) the first gaseous stream is at a temperature of 900° C. to 1,050° C. when contacted with the quench medium, and (xi) the cooled pyrolysis zone effluent is at a temperature of 650° C. to 850° C.

C30. The process of any of C1 to C29, wherein the gasification/combustion gas mixture comprises molecular hydrogen, carbon monoxide, and carbon dioxide or a flue gas comprising nitrogen, $CO_2$, and water.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for converting a hydrocarbon-containing feed by pyrolysis and gasification/combustion, comprising:

46

(I) heating a hydrocarbon-containing feed comprising $C_{5+}$ hydrocarbons and water to produce a heated feed;

(II) separating a vapor fraction and a liquid fraction from the heated feed, wherein the vapor fraction comprises steam;

(III) feeding:
(a) a portion of the vapor fraction through a first pyrolysis feed inlet into a first pyrolysis zone; and
(b) a portion of the liquid fraction through a second pyrolysis feed inlet into the first pyrolysis zone; and
(c) a first particle stream comprising particles having a pyrolysis temperature through a first particles inlet into the first pyrolysis zone;

(IV) optionally feeding a first steam stream through a first steam stream inlet into the first pyrolysis zone;

(V) contacting the vapor fraction and/or the liquid fraction with the particles in the first pyrolysis zone under a first set of pyrolysis conditions to effect pyrolysis of at least a portion of the hydrocarbons in the vapor fraction and/or the liquid fraction;

(VI) obtaining from the first pyrolysis zone a first pyrolysis zone effluent comprising olefins and the particles, wherein coke is formed on the surface of the particles;

(VII) obtaining from the first pyrolysis zone effluent a first gaseous stream rich in the olefins and a second particle stream rich in the particles;

(VIII) feeding at least a portion of the second particle stream, an oxidant stream, and optionally a second steam stream into a gasification/combustion zone;

(IX) contacting the second particle stream, the oxidant stream, and the optional second steam stream within the gasification/combustion zone to effect gasification and/or combustion of at least a portion of the coke disposed on the surface of the particles to produce a gasification/combustion zone effluent comprising regenerated particles and a gasification/combustion gas mixture;

(X) obtaining from the gasification/combustion zone effluent a second gaseous stream rich in the gasification/combustion gas mixture and a third particle stream rich in the regenerated particles; and (XI) feeding at least a portion of the third particle stream into the first pyrolysis zone as at least a portion of the first particle stream fed into the first pyrolysis zone in step (III).

2. The process of claim 1, wherein:
the first pyrolysis zone has a first end and a second end,
the first particles inlet is in proximity to or connected to the first end of the first pyrolysis zone;
the first pyrolysis zone effluent exits the first pyrolysis zone from the second end; and
the first pyrolysis feed inlet, if present, is located downstream of the first particles inlet and upstream of the second end;
the second pyrolysis feed inlet, if present, is located downstream of the first particles inlet and upstream of the second end; and
the first steam stream inlet, if present, is located downstream of the first particles inlet and upstream of the second end.

3. The process of claim 2, wherein both the first pyrolysis feed inlet and the second pyrolysis feed inlet are present, and the second pyrolysis feed inlet is downstream of the first pyrolysis feed inlet.

4. The process of claim 2, wherein both the first pyrolysis feed inlet and the second pyrolysis feed inlet are present at substantially the same distance from the first end, the first pyrolysis zone has a longitudinal axis, and the second pyrolysis feed inlet distributes the liquid fraction at a location closer to the longitudinal axis than the first pyrolysis feed inlet distributes the vapor fraction.

5. The process of claim 1, wherein the first steam stream inlet and the second pyrolysis feed inlet are both present, and the first steam stream inlet is located upstream of the second pyrolysis feed inlet.

6. The process of claim 1, wherein the first pyrolysis zone comprises a vessel wall, and the first steam feed inlet distributes steam at a location closer to the vessel wall than the second pyrolysis feed inlet distributes the liquid fraction.

7. The process of claim 1, wherein a third steam stream is injected into the liquid fraction to obtain a liquid fraction/steam mixture, and the liquid fraction/steam mixture is then fed into the first pyrolysis zone through the second pyrolysis feed inlet.

8. The process of claim 2, wherein the second pyrolysis feed inlet and the first steam stream inlet are located adjacent the second end of the first pyrolysis zone.

9. The process of claim 8, wherein the first pyrolysis feed inlet is located adjacent the first end of the first pyrolysis zone.

10. The process of claim 1, wherein step (VIII) further comprises feeding a diluent stream into the gasification/combustion zone, and wherein the diluent stream comprises a portion of the second gaseous stream obtained in step (X).

11. The process of claim 1, wherein at least one of the following is met:

(i) the hydrocarbon-containing feed is heated to a temperature of 325° C. to 450° C. in step (I);

(ii) a weight ratio of steam to the hydrocarbons in the vapor fraction fed into the first pyrolysis zone is from 0.05 to 2;

(iii) a weight ratio of the first steam stream to the hydrocarbons in the liquid fraction fed into the first pyrolysis zone is from 0.2 to 2;

(iv) the first pyrolysis zone is operated at a temperature of 800° C. to 1,100° C.;

(v) a pressure within the first pyrolysis zone is from 100 kPa-absolute to 7,000 kPa-absolute;

(vi) a velocity of the gaseous components within the first pyrolysis zone is in a range of 9 m/s to 155 m/s;

(vii) a velocity of the particles within the first pyrolysis zone is up to 15.5 m/s;

(viii) a velocity of gaseous components within the first pyrolysis zone is at least 20% greater than a velocity of the particles within the first pyrolysis zone;

(ix) a weight ratio of the particles to a combined amount of the vapor fraction and the liquid fraction fed into the first pyrolysis zone is from 10 to 50;

(x) the vapor fraction and/or the liquid fraction are contacted with the particles within the first pyrolysis zone for a residence time of 10 milliseconds to 700 milliseconds, and (xi) the first pyrolysis zone effluent is at a temperature of 900° C. to 1,050° C. when obtained from the first pyrolysis zone.

12. The process of claim 1, further comprising:

(XII) indirectly transferring heat from the second gaseous stream to a cooling medium to produce a cooled second gaseous stream comprising water;

(XIII) separating at least a portion of the water from the cooled second gaseous stream and, if present, optionally separating, at least one of: (i) at least a portion of any regenerated particles and (ii) at least a portion of hydrogen sulfide from the cooled second gaseous stream to produce a purified second gaseous stream; and (XIV) compressing at least a portion of the purified second gaseous stream to produce a compressed second gaseous stream.

13. The process of claim 12, wherein a portion of the compressed second gaseous stream is fed into the gasification/combustion zone in step (VIII) as a diluent stream.

14. The process of claim 1, wherein the particles fed into the first pyrolysis zone in step (III) comprise an oxide of a transition metal element capable of oxidizing molecular hydrogen within the first pyrolysis zone, and wherein at least a portion of the transition metal element in the particles in the third particle stream rich in the particles is at a reduced state compared to the transition metal element in the particles fed into the first pyrolysis zone.

15. The process of claim 14, wherein the oxide of the transition metal element favors the oxidation of hydrogen over the oxidation of hydrocarbons in the first pyrolysis zone.

16. The process of claim 1, wherein the gasification/combustion zone is operated at a temperature of at least 1,000° C. and at a pressure of <800 kPa-absolute.

17. The process of claim 1, wherein the gasification/combustion zone is operated at a temperature of at least 1,000° C. and at a pressure of ≥800 kPa-absolute.

18. The process of claim 1, wherein the gasification/combustion gas mixture comprises molecular hydrogen, carbon monoxide, and carbon dioxide or a flue gas comprising nitrogen, $CO_2$, and water.

19. The process of claim 1, wherein in step (III), at least a portion of the vapor fraction is fed into the first pyrolysis zone, and the process further comprises:

(XV) feeding at least a portion of the liquid fraction through a third pyrolysis feed inlet and a fourth particle stream comprising particles having a pyrolysis temperature through a second particles inlet into a second pyrolysis zone;

(XVI) optionally feeding a fourth steam stream through a fourth steam stream inlet into the second pyrolysis zone;

(XVII) contacting the liquid fraction with the particles in the second pyrolysis zone under a second set of pyrolysis conditions to effect pyrolysis of at least a portion of the hydrocarbons in the liquid fraction;

(XVIII) obtaining from the second pyrolysis zone a second pyrolysis zone effluent comprising olefins and the particles, wherein coke is formed on the surface of the particles; and (XIX) obtaining from the second pyrolysis zone effluent a third gaseous stream rich in the olefins and a fifth particle stream rich in the particles;

(XX) feeding at least a portion of the fifth particle stream, along with the second particle stream, the oxidant stream, and the optional second steam stream into the gasification/combustion zone; and (XXI) contacting the particle streams, the oxidant stream, and the optional second steam stream within the gasification/combustion zone to effect gasification/combustion of at least a portion of the coke disposed on the surface of the particles to produce the gasification/combustion zone effluent comprising the regenerated particles and the gasification/combustion gas mixture;

(XXII) obtaining from the gasification/combustion zone effluent the second gaseous stream rich in the gasification/combustion gas mixture and the third particle stream rich in the regenerated particles; and (XXIII) feeding a portion of the third particle stream into the second pyrolysis zone as at least a portion of the fourth particle stream fed into the second pyrolysis zone in step (XV).

20. The process of claim 19, wherein any portion of the liquid fraction is not fed into the first pyrolysis zone, and any portion of the vapor fraction is not fed into the second pyrolysis zone.

21. The process of claim 19, wherein step (XVI) is carried out, and the fourth steam stream inlet is downstream of the second particles inlet.

22. The process of claim 19, wherein at least one of the following is met:

(i) a weight ratio of steam to the liquid fraction fed into the second pyrolysis zone is 0.01:1 to 6:1;

the second pyrolysis zone is operated at a temperature of 800° C. to 1,100° C.;

a pressure within the second pyrolysis zone is from 100 kPa-absolute to 7,000 kPa-absolute;

a velocity of the vaporized liquid components within the second pyrolysis zone is in a range of 9 m/s to 155 m/s;

a velocity of the particles within the second pyrolysis zone is up to 15.5 m/s;

a velocity of vaporized liquid phase components within the second pyrolysis zone is at least 20% greater than a velocity of the particles within the second pyrolysis zone;

a weight ratio of the particles to the hydrocarbons in the liquid fraction fed into the second pyrolysis zone is 10 to 50;

the liquid fraction is contacted with the particles within the second pyrolysis zone for a residence time of 10 milliseconds to 700 milliseconds; and the second pyrolysis zone effluent is at a temperature of 900° C. to 1,050° C. when obtained from the second pyrolysis zone.

23. A process for converting a hydrocarbon-containing feed by pyrolysis and gasification/combustion, comprising:

(I) heating a hydrocarbon-containing feed comprising $C_{5+}$ hydrocarbons and water to produce a heated feed;

(II) separating a vapor fraction and a liquid fraction from the heated feed, wherein the vapor fraction comprises steam;

(III) feeding at least one of (a) a portion of the vapor fraction through a first pyrolysis feed inlet and (b) a portion of the liquid fraction through a second pyrolysis feed inlet, and a first particle stream comprising particles having a pyrolysis temperature through a first particles inlet into a first pyrolysis zone;

(IV) optionally feeding a first steam stream through a first steam stream inlet into the first pyrolysis zone;

(V) contacting the vapor fraction and/or the liquid fraction with the particles in the first pyrolysis zone under a first set of pyrolysis conditions to effect pyrolysis of at least a portion of the hydrocarbons in the vapor fraction and/or the liquid fraction;

(VI) obtaining from the first pyrolysis zone a first pyrolysis zone effluent comprising olefins and the particles, wherein coke is formed on the surface of the particles;

(VII) obtaining from the first pyrolysis zone effluent a first gaseous stream rich in the olefins and a second particle stream rich in the particles;

(VIII) feeding at least a portion of the second particle stream, an oxidant stream, and optionally a second steam stream into a gasification/combustion zone;

(IX) contacting the second particle stream, the oxidant stream, and the optional second steam stream within the gasification/combustion zone to effect gasification and/or combustion of at least a portion of the coke disposed on the surface of the particles to produce a gasification/combustion zone effluent comprising regenerated particles and a gasification/combustion gas mixture;

(X) obtaining from the gasification/combustion zone effluent a second gaseous stream rich in the gasification/combustion gas mixture and a third particle stream rich in the regenerated particles; and (XI) feeding at least a portion of the third particle stream into the first pyrolysis zone as at least a portion of the first particle stream fed into the first pyrolysis zone in step (III);

wherein:

the first pyrolysis zone has a first end and a second end, the first particles inlet is in proximity to or connected to the first end of the first pyrolysis zone;

the first pyrolysis zone effluent exits the first pyrolysis zone from the second end; and the first pyrolysis feed inlet, if present, is located downstream of the first particles inlet and upstream of the second end;

the second pyrolysis feed inlet, if present, is located downstream of the first particles inlet and upstream of the second end; and the first steam stream inlet, if present, is located downstream of the first particles inlet and upstream of the second end.

24. A process for converting a hydrocarbon-containing feed by pyrolysis and gasification/combustion, comprising:

(I) heating a hydrocarbon-containing feed comprising $C_{5+}$ hydrocarbons and water to produce a heated feed;

(II) separating a vapor fraction and a liquid fraction from the heated feed, wherein the vapor fraction comprises steam;

(III) feeding at least one of (a) a portion of the vapor fraction through a first pyrolysis feed inlet and (b) a portion of the liquid fraction through a second pyrolysis feed inlet, and a first particle stream comprising particles having a pyrolysis temperature through a first particles inlet into a first pyrolysis zone;

(IV) feeding a first steam stream through a first steam stream inlet into the first pyrolysis zone;

(V) contacting the vapor fraction and/or the liquid fraction with the particles in the first pyrolysis zone under a first set of pyrolysis conditions to effect pyrolysis of at least a portion of the hydrocarbons in the vapor fraction and/or the liquid fraction;

(VI) obtaining from the first pyrolysis zone a first pyrolysis zone effluent comprising olefins and the particles, wherein coke is formed on the surface of the particles;

(VII) obtaining from the first pyrolysis zone effluent a first gaseous stream rich in the olefins and a second particle stream rich in the particles;

(VIII) feeding at least a portion of the second particle stream, an oxidant stream, and optionally a second steam stream into a gasification/combustion zone;

(IX) contacting the second particle stream, the oxidant stream, and the optional second steam stream within the gasification/combustion zone to effect gasification and/or combustion of at least a portion of the coke disposed on the surface of the particles to produce a gasification/combustion zone effluent comprising regenerated particles and a gasification/combustion gas mixture;

(X) obtaining from the gasification/combustion zone effluent a second gaseous stream rich in the gasification/combustion gas mixture and a third particle stream rich in the regenerated particles; and (XI) feeding at least a portion of the third particle stream into the first pyrolysis zone as at least a portion of the first particle stream fed into the first pyrolysis zone in step (III), wherein the first steam stream inlet and the second pyrolysis feed inlet are both present, and the first steam stream inlet is located upstream of the second pyrolysis feed inlet.

\* \* \* \* \*